United States Patent
Kulfan et al.

(10) Patent No.: US 6,869,513 B2
(45) Date of Patent: Mar. 22, 2005

(54) PHOTODEGRADATION-RESISTANT ELECTRODEPOSITABLE COATING COMPOSITIONS WITH IMPROVED THROW POWER AND PROCESSES RELATED THERETO

(75) Inventors: Anthony D. Kulfan, Mars, PA (US); Ellor J. Van Buskirk, Wexford, PA (US); Craig A. Wilson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 458 days.

(21) Appl. No.: 10/010,437

(22) Filed: Nov. 8, 2001

(65) Prior Publication Data

US 2003/0098238 A1 May 29, 2003

(51) Int. Cl.[7] ............................................. C25D 13/10
(52) U.S. Cl. ...................... 204/488; 204/487; 204/486; 204/505; 204/506
(58) Field of Search .............................. 204/486, 487, 204/488, 489, 505, 506

(56) References Cited

U.S. PATENT DOCUMENTS

| | | | |
|---|---|---|---|
| 4,621,420 A | * 11/1986 | Takahashi et al. ............. | 29/856 |
| 4,755,418 A | 7/1988 | DebRoy et al. .............. | 428/215 |
| 4,956,402 A | 9/1990 | Perner et al. ................ | 523/415 |
| 5,015,673 A | 5/1991 | Perner et al. ................ | 523/415 |
| 5,096,555 A | 3/1992 | Schupp et al. ........... | 204/181.7 |
| 5,205,916 A | 4/1993 | Chung et al. ............. | 204/181.7 |
| 5,260,135 A | 11/1993 | Corrigan et al. ............ | 428/416 |
| 5,446,084 A | 8/1995 | Huemke et al. ............ | 524/504 |
| 6,200,447 B1 | 3/2001 | Brücken et al. ............ | 204/499 |
| 6,398,934 B1 | 6/2002 | Klein et al. ................. | 204/480 |

FOREIGN PATENT DOCUMENTS

| | | |
|---|---|---|
| EP | 0 265 363 | 4/1983 |
| JP | 2000-281943 A | * 10/2000 |

* cited by examiner

*Primary Examiner*—Kishor Mayekar
(74) *Attorney, Agent, or Firm*—Deborah M. Altman

(57) ABSTRACT

The invention provides a photodegradation resistant curable electrodepositable coating composition which includes one or more ungelled, active hydrogen-containing cationic sulfonium salt group-containing resins which are electrodepositable on a cathode, and one or more curing agents having cationic groups or groups which are capable of forming cationic groups. The invention also provides processes for coating an electroconductive substrate with the coating composition, to form single layer or multi-layer composite coatings. Also provided is a multi-layer composite coating in which the electrodepositable coating composition is used to form the primer layer. The compositions have improved throw power versus typical sulfonium salt electrodepositable compositions.

62 Claims, No Drawings

PHOTODEGRADATION-RESISTANT ELECTRODEPOSITABLE COATING COMPOSITIONS WITH IMPROVED THROW POWER AND PROCESSES RELATED THERETO

FIELD OF THE INVENTION

The present invention is directed to an electrodepositable composition and a process for coating an electroconductive substrate using the composition. More particularly, the present invention is directed to single and multi-layer composite coatings comprising a photodegradation-resistant, high throw power electrodepositable composition with an optional top coat thereover, and to a process for forming such a coating on the substrate.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece to be coated serving as the anode. This was familiarly referred to as anionic electrodeposition. However, in 1972 cationic electrodeposition was introduced commercially and has continued to gain in popularity. Today, cationic electrodeposition is by far the prevalent method of electrodeposition For example, a cationic primer coating is applied by electrodeposition to more that 80 percent of all motor vehicles produced throughout the world.

One important aspect of an electrodeposition coating system is its throw power. The term throw power refers to the ability to electrodeposit coatings in recessed areas of a work piece. A coating which has the ability to coat highly recessed areas is said to have high throw power. High throw power systems are desirable because a work piece can be more completely coated. For example, in automotive applications, coating of interior surfaces of double walled work pieces is desirable for increased corrosion resistance. Similarly, in the electrodeposition of other industrial articles, such as heaters or radiators having multiple walls or panels, high throw power electrodeposition systems are necessary to provide more corrosion resistance.

It is known, for a given system, that throw power can be increased by the application of higher voltage. However, excessively high voltage will cause dielectric breakdown and film defects commonly known as film ruptures. Thus, coatings which have a high rupture voltage are useful because higher throw power can be achieved while maintaining a smooth uniform film without ruptures. Throw power can also be affected by a higher conductivity of the electrodeposition bath. It is also generally recognized that higher molecular weight compositions tend to have higher throw power.

Resins having sulfonium salt groups have been used in cationic electrodepositable coating compositions to impart improved exposure durability and color stability as compared with their amine salt and quaternary ammonium salt counterparts. One disadvantage of sulfonium salt group-containing coating compositions, however, is their low throw power, due in large part to low bath conductivity.

The effect of low molecular weight amine salts on throw-power is known. U.S. Pat. No. 6,200,447 discloses the use of amine salt group-containing epoxy resins to improve throw power. Preference is given to low molecular weight amine salts, with the requirement that the amine salts be present in unbound form in the coating composition. U.S. Pat. No. 5,096,555 discloses a cationic electrodepositable coating composition comprising an amine salt or quaternary ammonium salt group-containing binder and a pre-dispersed cationic crosslinker. No mention is made of primary or secondary amines or their subsequently formed salts thereof, which have been found to give good conductivity and superior throw power.

U.S. Pat. No. 4,956,402 discloses a cationic electrodepositable coating composition that contains cationically charged urethane-containing resins, the urethane groups being covalently bonded to the backbone. The cationic charge on said binder is derived from basic amine groups. The invention is limited to compositions comprising epoxy resins having amine salt groups in the polymer backbone, which can be high in throw power without special modification. These compositions can be inherently self-crosslinking, and thus do not require a separate crosslinker.

Electrodepositable primer coating compositions, particularly those used in the automotive industry, typically are corrosion-resistant epoxy-based compositions crosslinked with aromatic isocyanates. If exposed to ultraviolet energy, such as sunlight, these compositions can undergo photodegradation. In some applications, a primer-surfacer is spray-applied directly to the cured electrodeposited coating prior to application of one or more top coats The primer-surfacer can provide a variety of properties to the coating system, including protection of the electrodeposited coating from photodegradation. Alternatively, one or more top coats can be applied directly to the cured electrodeposited coating and in such instances, these top coat(s) typically are formulated such that the top coat provides sufficient protection to prevent photodegradation of the electrodeposited primer coating. If the top coat(s) do not provide sufficient protection, photodegradation of the electrodeposited primer coating can result in delamination of the subsequently applied top coats from the cured electrodeposited primer coatings producing catastrophic failure of the cured coating system.

For example, if one or more top coats are sufficiently opaque to ultraviolet light transmission, such as by a high concentration of pigment and/or light absorbing compounds, little or no ultraviolet light can penetrate through the top coat(s) to the electrodeposited primer coating to cause photodegradation. However, if a thin top coat and/or a top coat which is not ultraviolet light absorbing is applied to the cured electrodeposited primer coating, ultraviolet light can pass through the top coat(s) resulting in photodegradation of the cured electrodeposited primer coating. Such a problem is likely to occur when a top coat is lightly pigmented with metal flake pigments which tend to allow transmission of ultraviolet light to the previously applied and cured electrodeposited primer coating.

A variety of approaches are known to avoid photodegradation of the cured electrodeposited coatings. As mentioned above, top coats can be formulated to have a high concentration of pigments which provide ultraviolet light opacity. Further, top coat formulations can include additives to prevent or diminish the transmission of ultraviolet light such as ultraviolet light absorbers ("UVAS") and/or hindered amine light stabilizers ("HALS") which can be used in combination with anti-oxidants, for example, phenolic anti-oxidants.

Other factors can exacerbate the photosensitivity of an epoxy-based primer, thereby contributing to delamination of a subsequently applied top coat from the primer coating. Such factors include, but are not limited to, the use of aromatic isocyanate crosslinkers, and overbake of the electrodeposited primer coating at excessive times and/or temperatures U.S. Pat. No. 4,755,418 discloses a method of preventing the yellowing of the outermost coating of a multicoat coating system. The method comprises initially depositing onto a conductive substrate by cathodic electrodeposition a primer coating of at least one layer of an amine-epoxy resin adduct and a cross-linking agent; curing the primer to a hard, durable film; depositing a second coating onto the primer layer comprising at least one layer of a pigmented basecoat; depositing a third outermost coating onto the second coating comprising at least one layer of a clear top coat; and simultaneously curing the basecoat and the clear top coat. The electrodepositable primer coating composition contains a blocked polyisocyanate cross-linking agent selected from aliphatic polyisocyanates of at least six carbon atoms, the isocyanurates of aliphatic polyisocyanates, aromatic polyisoycanates having a molecular weight greater than 174, and the isocyanurates of aromatic diisocyanates having a molecular weight greater than 174.

U.S. Pat. No. 5,205,916 discloses electrodepositable primer compositions containing an aqueous dispersion of an epoxy-based ionic resin and an anitoxidant additive comprising a combination of a phenolic antioxidant and a sulfur-containing antioxidant. Such additives are disclosed as providing reduced overbake yellowing of the subsequently applied top coats as well as preventing intercoat delamination of these top coats upon exterior exposure.

U.S. Pat. No. 5,260,135 discloses photodegradation-resistant electrodepositable compositions comprising an epoxy-based ionic resin, a hindered amine light stabilizer present at levels of about 1 percent, and a phenolic antioxidant. Although effective for improving the resistance of the electrodeposited coating to photodegradation, the effect can vary somewhat due to the volatilization of the HALS present at the surface upon thermal curing of the composition. In some instances, the inclusion of HALS in electrodepositable coating compositions will provide only a marginal improvement for photodegradation resistance of the cured electrodeposited coating because the HALS can migrate into the subsequently applied top coating layers. Moreover, due to environmental and toxicity concerns, it is desirable to avoid the use of phenolic compounds such as the phenolic antioxidant mentioned above.

Although the aforementioned references disclose photodegradation resistant coating systems which can provide many advantages, each of the respective coating system disclosed therein can have one or more deficiencies, including low throw-power, excessive cost, toxicity issues, or marginal effectiveness. Accordingly, there remains a need in the coatings industry for a cost effective electrodepositable composition which retards photodegradation and delamination of subsequently applied top coats independent of the top coat composition(s). Additionally, there remains a need for a high throw power, photodegradation resistant electrodepositable composition that can be used in a single coat application.

SUMMARY OF THE INVENTION

In one embodiment, the present invention is directed to an improved curable electrodepositable coating composition. The composition comprises a resinous phase dispersed in an aqueous medium, the resinous phase comprising (a) one or more ungelled, active hydrogen-containing cationic sulfonium salt group-containing resins which are electrodepositable on a cathode, and (b) one or more curing agents comprising cationic groups or groups which are capable of forming cationic groups.

The present invention is further directed to a process for coating an electroconductive substrate. The process comprises (a) electrophoretically depositing on the substrate a curable electrodepositable coating composition to form an electrodeposited coating over at least a portion of the substrate; (b) heating the coated substrate to a temperature and for a time sufficient to cure the electrodeposited coating on the substrate; (c) applying directly to the cured electrodeposited coating one or more pigment-containing coating compositions and/or one or more pigment-free coating compositions to form a top coat over at least a portion of the cured electrodeposited coating; and (d) heating the coated substrate of step (c) to a temperature and for a time sufficient to cure the top coat. The electrodepositable coating composition comprises a resinous phase dispersed in an aqueous medium, the resinous phase comprising: (i) one or more ungelled, active hydrogen-containing cationic sulfonium salt group-containing resins which are electrodepositable on a cathode, and (ii) one or more curing agents comprising cationic amine salt groups or groups which are capable of forming cationic amine salt groups.

In another embodiment the present invention provides a process for forming a photodegradation-resistant multi-layer coating on an electroconductive substrate. The process comprises (a) electrophoretically depositing on the substrate a curable electrodepositable coating composition to form an electrodeposited coating over at least a portion of the substrate; (b) heating the coated substrate in an atmosphere having 5 parts per million or less of NOx at a temperature and for a time sufficient to cure the electrodeposited coating on the substrate; (c) applying directly to the cured electrodeposited coating one or more pigment-containing coating compositions and/or one or more pigment-free coating compositions to form a top coat over at least a portion of the cured electrodeposited coating; and (d) heating the coated substrate of step (c) to a temperature and for a time sufficient to cure the top coat. The electrodepositable coating composition comprises a resinous phase dispersed in an aqueous medium, said resinous phase comprising (i) one or more ungelled, active hydrogen-containing cationic sulfonium salt group-containing resins which are electrodepositable on a cathode, and (ii) one or more curing agents comprising cationic amine salt groups or groups which are capable of forming cationic amine salt groups.

In a further embodiment, the present invention is directed to an improved process for forming a photodegradation-resistant multi-layer coating on an electroconductive substrate comprising (a) electrophoretically depositing on the substrate a curable electrodepositable coating composition to form an electrodeposited coating over at least a portion of the substrate, the substrate serving as a cathode in an electrical circuit comprising the cathode and an anode, the cathode and the anode being immersed in the aqueous electrodepositable coating composition, wherein electric current is passed between the cathode and the anode to cause the coating to be electrodeposited over at least a portion of the substrate; (b) heating the coating at a temperature and for a time sufficient to cure the electrodeposited coating on the substrate; (c) applying directly to the cured electrodeposited coating one or more pigment-containing coating compositions and/or one or more pigment-free coating compositions to form a top coat over at least a portion of the cured electrodeposited coating; and (d) heating the coated substrate of step (c) to a temperature and for a time sufficient to cure the top coat. The electrodepositable coating composition comprises a resinous phase dispersed in an aqueous medium, said resinous phase comprising (i) one or more ungelled, active hydrogen-containing cationic sulfonium salt group-containing resins which are electrodepositable on a cathode, and (ii) one or more curing agents comprising cationic amine salt groups or groups which are capable of forming cationic amine salt groups. The improvement comprises the inclusion in the circuit of a non-ferrous anode.

The present invention is also directed to an improved curable electrodepositable coating composition comprising a resinous phase dispersed in an aqueous medium. The resinous phase comprises (a) one or more ungelled, active hydrogen-containing cationic sulfonium salt group-containing resins which are depositable on a cathode, said resins selected from at least one of an acrylic polymer, a polyepoxide polymer, and mixtures thereof, and (b) one or more aliphatic polyisocyanate curing agents comprising amine salt groups derived from one or more primary amine groups selected from diglycolamine, ethanolamine, diethylenetriamine, 2-(2-aminoethylamino)ethanol, and 2-amino-2-methyl-1-propanol.

In one embodiment, the present invention provides an improved process for forming a photodegradation-resistant multi-layer coating on an electroconductive substrate. The process comprises (a) electrophoretically depositing on the substrate a curable electrodepositable coating composition to form an electrodeposited coating over at least a portion of the substrate; (b) heating the coated substrate to a temperature ranging from 275° to 400° F. (135° to 204.4° C.) for a time sufficient to cure the electrodeposited coating on the substrate; (c) applying directly to the cured electrodeposited coating one or more pigment-containing coating compositions and/or one or more pigment-free coating compositions to form a top coat over at least a portion of the cured electrodeposited coating; and (d) heating the coated substrate of step (c) to a temperature and for a time sufficient to cure the top coat. The electrodepositable coating composition comprises a resinous phase dispersed in an aqueous medium, the resinous phase comprising (i) one or more ungelled, active hydrogen-containing cationic sulfonium salt group-containing resins which are depositable on a cathode, the resins being selected from at least one of an acrylic polymer, a polyepoxide polymer, and mixtures thereof, and (ii) one or more aliphatic polyisocyanate curing agents comprising amine salt groups derived from one or more primary amine groups selected from diglycolamine, ethanolamine, diethylenetriamine, 2-(2-aminoethylamino) ethanol, and 2-amino-2-methyl-1-propanol.

In yet another embodiment, the present invention provides a photodegradation-resistant multi-layer composite coating comprising a cured primer coating layer over at least a portion of an electroconductive substrate, and a cured top coat layer over at least a portion of the cured primer coating layer. The primer coating layer is formed from a curable electrodepositable coating composition comprising a resinous phase dispersed in an aqueous medium, the resinous phase comprising (a) one or more ungelled, active hydrogen-containing cationic sulfonium salt group-containing resins which are depositable on a cathode, and (b) one or more curing agents comprising cationic amine salt groups or groups which are capable of forming cationic amine salt groups. The topcoat layer is formed from one or more pigment-containing coating compositions and/or one or more pigment-free coating compositions. The multi-layer composite coating is characterized in that it exhibits substantially no interlayer delamination between the cured primer coating layer and the cured top coat layer upon concentrated solar spectral irradiance exposure equivalent to two years outdoor weathering when the top coat layer has at least 80 percent light transmission as measured at 400 nanometers.

The present invention further provides a photodegradation-resistant multi-layer composite coating comprising a cured primer coating layer over at least a portion of an electroconductive substrate, and a cured top coat layer over at least a portion of the cured primer coating layer The primer coating layer is formed from a curable electrodepositable coating composition comprising a resinous phase dispersed in an aqueous medium. The resinous phase comprises (a) one or more ungelled, active hydrogen-containing cationic sulfonium salt group-containing resins which are depositable on a cathode, the resins selected from at least one of an acrylic polymer, a polyepoxide polymer, and mixtures thereof, and (b) one or more aliphatic polyisocyanate curing agents comprising amine salt groups derived from one or more primary amine groups selected from diglycolamine, ethanolamine, and diethylenetriamine, 2-(2-aminoethylamino)ethanol, and 2-amino-2-methyl-1-propanol. The topcoat layer is formed from one or more pigment-containing coating compositions and/or one or more pigment-free coating compositions, characterized in that the multi-layer composite coating exhibits substantially no interlayer delamination between the cured primer coating layer and the cured top coat layer upon concentrated solar spectral irradiance exposure equivalent to two years outdoor weathering when the top coat layer has at least 80 percent light transmission as measured at 400 nanometers.

The present invention is further directed to a process for coating an electroconductive substrate. The process comprises (a) electrophoretically depositing on the substrate a curable electrodepositable coating composition to form an electrodeposited coating over at least a portion of the substrate, and (b) heating the coated substrate to a temperature and for a time sufficient to cure the electrodeposited coating on the substrate. The electrodepositable coating composition comprises a resinous phase dispersed in an aqueous medium, the resinous phase comprising (i) one or more ungelled, active hydrogen-containing cationic sulfonium salt group-containing resins which are electrodepositable on a cathode, and (ii) one or more curing agents comprising cationic amine salt groups or groups which are capable of forming cationic amine salt groups

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As mentioned above, in one embodiment, the present invention is directed to an improved curable electrodepositable coating composition. The composition comprises a resinous phase dispersed in an aqueous medium, the resinous phase comprising (a) one or more ungelled, active hydrogen-containing cationic sulfonium salt group-containing resins which are electrodepositable on a cathode, and (b) one or more curing agents comprising cationic groups or groups which are capable of forming cationic groups.

Cationic polymers suitable for use in the electrodepositable coating compositions, typically as the main film-forming polymer, can include any of a number of cationic sulfonium group-containing polymers so long as the polymers are "water dispersible," i.e., adapted to be solubilized, dispersed or emulsified in water. Such polymers comprise cationic sulfonium functional groups to impart a positive charge.

By "ungelled" is meant the resins are substantially free of crosslinking and have an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of essentially infinitely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

Also, as used herein, the term "polymer" is meant to refer to oligomers and both homopolymers and copolymers. Unless stated otherwise, as used in the specification and the claims, molecular weights are number average molecular weights for polymeric materials indicated as "Mn" and obtained by gel permeation chromatography using polystyrene standards in an art-recognized manner Suitable examples of such cationic film-forming resins can include active hydrogen-containing, cationic polymers selected from one or more of a polyepoxide polymer, an acrylic polymer, a polyurethane polymer, a polyester polymer, combinations thereof and copolymers thereof, for example a polyester-polyurethane polymer. Typically, the resin (a) comprises a polyepoxide polymer, an acrylic polymer, or a mixture of a polyepoxide polymer and an acrylic polymer. As aforementioned, the polymers which are suitable for use as the cationic resin (a), comprise active hydrogens as curing reaction sites. The term "active hydrogen" refers to those groups which are reactive with isocyanates as determined by the Zerewitnoff test as is described in the JOURNAL OF THE AMERICAN CHEMICAL SOCIETY, Vol. 49, page 3181 (1927). In one embodiment of the present invention, the active hydrogens are derived from hydroxyl groups, primary amine groups and/or secondary amine groups.

Any of a variety of polyepoxides known in the related art can be used to form the cationic resin (a). Examples of polyepoxides which are suitable for this purpose include those having a 1,2-epoxy equivalency greater than one, and typically two; that is, polyepoxides that have on average two epoxide groups per molecule. Such polyepoxide polymers can include the polyglycidyl ethers of cyclic polyols, for example polyhydric phenols, such as Bisphenol A. These polyepoxides can be prepared by etherifiction of polyhydric phenols with an epihalohydrin or dihalohydrin such as epichlorohydrin or dichlorohydrin in the presence of alkali. Nonlimiting examples of suitable polyhydric phenols include 2,2-bis-(4-hydroxyphenyl)propane, 1,1-bis-(4-hydroxyphenyl)ethane, 2-metyl-1,1-bis-(4-hydroxyphenyl) propane, 2,2-(4-hydroxy-3-tertiarybutylphenyl)propane, and bis-(2-hydroxynaphthyl)methane.

Besides polyhydric phenols, other cyclic polyols can be used to prepare the polyglycidyl ethers of cyclic polyol derivatives. Examples of such cyclic polyols include alicyclic polyols, such as cycloaliphatic polyols, for example 1,2-cyclohexanediol, 1,4-cyclohexanediol, 1,2-bis-(hydroxymethyl)cyclohexane, 1,3-bis-(hydroxymethyl) cyclohexane and hydrogenated bisphenol A.

The polyepoxides can be (and typically are) chain-extended with a polyether or a polyester polyol. Examples of suitable polyether polyols and conditions for chain extension are disclosed in U.S. Pat. No. , 4,468,307. Examples of polyester polyols for chain extension are disclosed in U.S. Pat. No. 4,148,772.

Other suitable polyepoxides can be produced similarly from novolak resins or similar polyphenols. Such polyepoxide resins are described in U.S. Pat. Nos. 3,663,389; 3,984,299; 3,947,338; and 3,947,339. Additional polyepoxide resins which are suitable for use in forming the cationic resin (a) include those described in U.S. Pat. Nos. 4,755,418, 5,948,229 and 6,017,432., .

Suitable acrylic polymers from which the active hydrogen-containing, cationic salt group-containing polymer may be derived can include copolymers of one or more alkyl esters of acrylic acid or methacrylic acid optionally together with one or more other polymerizable ethylenically unsaturated monomers. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include nitriles such acrylonitrile and methacrylonitrile, vinyl and vinylidene halides such as vinyl chloride and vinylidene fluoride and vinyl esters such as vinyl acetate. Acid and anhydride functional ethylenically unsaturated monomers such as acrylic acid, methacrylic acid or anhydride, itaconic acid, maleic acid or anhydride, or flumaric acid may be used. Amide functional monomers including acrylamide, methacrylamide, and N-alkyl substituted (meth)acrylamides are also suitable. Vinyl aromatic compounds such as styrene and vinyl toluene can be used so long as photodegradation resistance of the polymer and the resulting electrodeposited coating is not compromised.

Functional groups such as hydroxyl and amino groups can be incorporated into the acrylic polymer by using functional monomers such as hydroxyalkyl acrylates and methacrylates or aminoalkyl acrylates and methacrylates. Epoxide functional groups (for conversion to cationic salt groups) may be incorporated into the acrylic polymer by using functional monomers such as glycidyl acrylate and methacrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the acrylic polymer by reacting carboxyl groups on the acrylic polymer with an epihalohydrin or dihalohydrin such as epichlorohydrin or dichlorohydrin.

The acrylic polymer can be prepared by traditional free radical initiated polymerization techniques, such as solution or emulsion polymerization, as known in the art, using suitable catalysts which include organic peroxides and azo type compounds and optionally chain transfer agents such as alpha-methyl styrene dimer and tertiary dodecyl mercaptan. Additional acrylic polymers which are suitable for forming the active hydrogen-containing, cationic sulfonium salt group-containing resin (a) which is used in the electrodepositable compositions of the present invention include those resins described in U.S. Pat. Nos. 3,455,806 and 3,928,157.

Polyurethanes can also be used as the polymer from which the active hydrogen-containing, sulfonium salt group-containing resin can be derived. Among the polyurethanes which can be used are polymeric polyols which are prepared by reacting polyester polyols or acrylic polyols such as those mentioned above with a polyisocyanate such that the OH/NCO equivalent ratio is greater than 1:1 so that free hydroxyl groups are present in the product. Smaller polyhydric alcohols such as those disclosed above for use in the preparation of the polyester may also be used in place of or in combination with the polymeric polyols.

Additional examples of polyurethane polymers suitable for forming the active hydrogen-containing, cationic sulfonium salt group-containing resin (a) include the polyurethane, polyurea, and poly(urethane-urea) polymers prepared by reacting polyether polyols and/or polyether polyamines with polyisocyanates. Such polyurethane polymers are described in U.S. Pat. No. 6,248,225.

Epoxide functional groups may be incorporated into the polyurethane by methods well known in the art. For example, epoxide groups can be incorporated by reacting glycidol with free isocyanate groups. Alternatively, hydroxyl groups on the polyurethane can be reacted with an epihalohydrin or dihalohydrin such as epichlorohydrin or dichlorohydrin in the presence of alkali.

Sulfonium group-containing polyurethanes can also be made by at least partial reaction of hydroxy-functional sulfide compounds, such as thiodiglycol and thiodipropanol, which results in incorporation of sulfur into the backbone of the polymer. The sulfur-containing polymer is then reacted with a monofunctional epoxy compound in the presence of acid to form the sulfonium group. Appropriate monofunctional epoxy compounds include ethylene oxide, propylene oxide, glycidol, phenylglycidyl ether, and CARDURA® E, available from Resolution Performance Products.

Besides the above-described polyepoxide and acrylic polymers, the active hydrogen-containing, cationic salt group-containing polymer can be derived from a polyester. Such polyesters can be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol. Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

The polyesters contain a portion of free hydroxyl groups (resulting from the use of excess polyhydric alcohol and/or higher polyols during preparation of the polyester) which are available for cure reactions Epoxide functional groups may be incorporated into the polyester by reacting carboxyl groups on the polyester with an epihalohydrin or dihalohydrin such as epichlorohydrin or dichlorohydrin.

Sulfonium salt groups can be introduced by the reaction of an epoxy group-containing polymer of the types described above with a sulfide in the presence of an acid, as described in U.S. Pat. Nos. 3,959,106 and 4,715,898. Sulfonium groups can be introduced onto the polyester backbones described using similar reaction conditions.

The polymers used in the electrodepositable coating composition of the present invention can have number average molecular weights (Mn) ranging from about 1000 to 20,000, often from 1000 to 10,000, and typically from 1000 to 8000, depending on the type of resin used, as determined by gel permeation chromatography using a polystyrene standard.

Generally, the cationic polymer is ungelled and contains from about 0.1 to 3.0, preferably from about 0.1 to 0.7 millequivalents of cationic salt group per gram of polymer solids.

The active hydrogens associated with the cationic polymer include any active hydrogens which are reactive with isocyanates within the temperature range of about 93° C. to 204° C., preferably about 121° C. to 180° C. Typically, the active hydrogens are hydroxyl. Preferably, the polymer will have an active hydrogen content of about 1.7 to 10 millequivalents, more preferably about 2 to 5 millequivalents of active hydrogen per gram of polymer solids.

The sulfonium group-containing resin (a) is typically present in the electrodepositable composition of the present invention in an amount of 20 to 90 percent, preferably 40 to 80 percent by weight, based on the total weight of the sulfonium salt group-containing polymer (a) and the curing agent (b).

As mentioned above, the resinous phase of the electrodepositable coating composition further comprises a curing agent (b) comprising cationic groups or groups which are capable of forming cationic groups, and which is adapted to react with the active hydrogens of the sulfonium group-containing electrodepositable resin (a) described immediately above. In one embodiment of the present invention, the curing agent (b) comprises one or more at least partially blocked polyisocyanates.

The curing agents employed in the cationic electrodepositable compositions of the present invention are typically blocked polyisocyanates. The polyisocyanates are fully blocked as described in U.S. Pat. No. 3,984,299 column 1 lines 1 to 68, column 2 and column 3 lines 1 to 15. By "blocked" is meant that the isocyanate groups have been reacted with a compound such that the resultant blocked isocyanate group is stable to active hydrogens at ambient temperature but reactive with active hydrogens in the film forming polymer at elevated temperatures usually between 90° C. and 200° C. In one embodiment of the present invention, the polyisocyanate curing agent is a fully blocked polyisocyanate with substantially no free isocyanate groups.

Diisocyanates typically are used, although higher polyisocyanates can be used in lieu of or in combination with diisocyanates. The polyisocyanates can be aromatic, araliphatic or aliphatic. Examples of aromatic polyisocyanates suitable for use as curing agents are diisocyanates such as 2,4-toluene diisocyanate, 2,6-toluene diisocyanate, methylene diphenyl diisocyanate, oligomeric methylene diphenyl diisocyanate, and mixtures thereof. Examples of araliphatic and aliphatic polyisocyanates suitable for use as curing agents include polyisocyanates such as 1,6-hexamethylene diisocyanate, isophorone diisocyanate, bis-(isocyanatocyclohexyl)methane, polymeric 1,6-hexamethylene diisocyanate, trimerized isophorone diisocyante, norbornane diisocyanate, tetramethyl xylene diisocyanate and mixtures thereof. In a preferred embodiment of the present invention, the curing agent (b) comprises aliphatic polyisocyanate.

In one embodiment of the present invention, the polyisocyanate curing agent comprises amine salt groups or groups which are capable of forming amine salt groups. In the present invention, the curing agent comprises one or more pendant basic amine groups or pendant amine salt groups. By "pendant" is meant that amino groups are present as a substituent which is pendant from or in the terminal position of the polymeric backbone, or, alternatively, is an end-group substituent of a group which is pendant and/or terminal from the polymer backbone. In other words, the amino groups from which the cationic amine salt groups are derived are not within the polymeric backbone. The pendant amine groups of the present invention are capable of being protonated at the pH of the electrodepositable coating bath, typically above a pH of 4, more typically above a pH of 5. In a particular embodiment of the present invention, the pendant amine groups comprise primary amine groups. In a further embodiment, the curing agent comprises a blocked polyisocyanate essentially free of tertiary amine groups.

Such pendant amine groups can be derived from an amine compound containing at least one additional active hydrogen-containing group which is reactive with an isocyanate. Examples of suitable amine group-containing compounds include hydroxyalkyl primary amines such as ethanolamine, propanolamine and higher homologs including 4-amino-1-butanol and 5-amino-1-pentanol, diglycolamine, 2-amino-2-methyl-1-propanol; primary amines also containing secondary amine such as 2-(2-aminoethylamino)ethanol, 2-(3-aminopropylamino)ethanol and aminoethylpiperazine; N-alkylalkylenediamines such as N-propylethylenediamine and N-methylpropanediamine; and diethylenetriamine, 1,3-diamino-2-hyroxypropane, triethylene tetramine and higher homologs. Additionally, any primary amine in the form of a ketimine which also contains at least one active hydrogen group can be reacted with epoxides such as ethylene oxide or propylene oxide to form a terminal hydroxy group which can react with a polyisocyanate. Tertiary amines containing at least one active hydrogen group can also be used, such as dimethylethanolamine, diethylethanolamine, dimethylpropanolamine, N-hydroxyethylpiperidine, and N,N-diethyl-N'-methylethylenediamine. Preferred are compounds containing one or more primary amine groups such as ethanolamine, propanolamine, 4-amino-1-butanol, 5-amino-1-pentanol, diglycolamine, 2-amino-2-methyl-1-propanol, 2-(2-aminoethylamino)ethanol, 2-(3-aminopropylamino)ethanol, aminoethylpiperazine; N-alkylalkylenediamines such as N-propylethylenediamine and N-methylpropanediamine; diethylenetriamine, 1,3-diamino-2-hyroxypropane, triethylene tetramine and higher homologs, and the reaction product of a primary amine in the form of a ketimine which also contain at least one active hydrogen group with an epoxide such as ethylene oxide or propylene oxide. One or more of these compounds is reacted with one or more of the above described polyisocyanates to form a urethane or urea group. In one particular embodiment, the curing agent comprises cationic salt groups derived from at least one compound selected from diglycolamine, ethanolamine, diethylenetriamine, 2-(2-aminoethylamino)ethanol, and 2-amino-2-methyl-1-propanol. It should be understood that when the pendant amine groups comprise primary amine groups, the primary amino groups can be blocked, for example, by reaction with a ketone such as methyl ethyl ketone, to form the ketimine. Such ketimines are those described in U.S. Pat. No. 4,104,147, column 6, line 23 to column 7, line 23. The ketimine groups can decompose upon dispersing the blocked polyisocyanate curing agent in water, thereby providing free primary amine groups as curing reaction sites.

The pendant amines of the curing agent comprise amine groups such that the active hydrogens of said amines can be consumed by reaction with the curing agent to form urea groups or linkages during a subsequent curing reaction.

The curing agent is additionally at least partially blocked with at least one blocking agent selected from an alkyl alcohol, for example n-butanol; a 1,2-alkane diol, for example 1,2-propanediol; a 1,3-alkane diol, for example 1,3-butanediol; a benzylic alcohol, for example benzyl alcohol; an allylic alcohol, for example allyl alcohol; an oxime, for example methyl ethyl ketoxime; a glycol ether, for example ethylene glycol butyl ether; caprolactam; a dialkylamine, for example dibutylamine, and mixtures thereof.

The curing agent (b) can be incorporated into the coating composition in a conventional manner, that is admixing the curing agent with the active hydrogen-containing sulfonium group-containing resin described above in organic solution, then dispersed into aqueous solution, said aqueous solution optionally comprising additional acid. Alternatively, the curing agent can be incorporated in the form of an at least partially neutralized aqueous dispersion. In the instance of dispersing the curing agent in a separate step, the amine groups are rendered cationic by at least partial neutralization with an acid. Suitable acids include organic and inorganic acids such as formic acid, acetic acid, lactic acid, phosphoric acid, dimethylolpropionic acid, and sulfamic acid. Mixtures of acids can be used. Typically, the amount of acid used provides at least 20 percent of the total theoretical neutralization.

The curing agent (b) can be present in the electrodepositable composition in an amount ranging from 80 to 10 percent, and typically from 60 to 20 percent by weight, based on the total combined weight of the sulfonium salt group-containing polymer (a) and the curing agent (b).

The composition can further comprise at least one source of a metal selected from rare earth metals such as, yttrium, bismuth, zirconium, tungsten, and mixtures thereof, present in an amount of 0.005 to 5 percent by weight metal, based on the total weight of polymer solids in the coating composition. Yttrium is typically employed.

Both soluble and insoluble yttrium compounds may serve as the source of yttrium in the electrodepositable composition used in the process of the present invention. Examples of yttrium sources suitable for use in the electrodepositable composition are soluble organic and inorganic yttrium salts such as yttrium acetate, yttrium chloride, yttrium formate, yttrium carbonate, yttrium sulfamate, yttrium lactate and yttrium nitrate. When the yttrium is to be added to the composition as an aqueous solution, yttrium nitrate, a readily available yttrium compound, is a preferred yttrium source. Other suitable yttrium compounds are organic and inorganic yttrium compounds such as yttrium oxide, yttrium bromide, yttrium hydroxide, yttrium molybdate, yttrium sulfate, yttrium silicate, and yttrium oxalate. Organoyttrium complexes and yttrium metal can also be used. When the yttrium is to be incorporated into the composition as a component in a pigment paste, yttrium oxide is the preferred source of yttrium.

Suitable rare earth metal compounds include soluble, insoluble, organic, and inorganic salts of rare earth metals, such as acetates, oxalates, formates, lactates, oxides, hydroxides, molybdates, etc., of the rare earth metals.

There are various methods by which the yttrium, bismuth, zirconium, tungsten, or rare earth metal compound can be incorporated into the electrodepositable composition used in the process of the present invention. A soluble compound may be added "neat," that is, added directly to the composition without prior blending or reacting with other components. Alternatively, a soluble compound can be added to the predispersed clear polymer feed which may include the cationic polymer, the curing agent and/or any other non-pigmented component. Preferably, a soluble compound is added "neat". Insoluble compounds and/or metal pigments, on the other hand, are preferably pre-blended with a pigment paste component prior to the incorporation of the paste to the electrodepositable composition.

The electrodepositable composition of the present invention can contain yttrium, bismuth, zirconium, tungsten, or a rare earth metal as the sole corrosion inhibiting inorganic component or can be supplemented with other corrosion inhibiting inorganic or organic components such as calcium. In one embodiment of the present invention, the electrodepositable coating composition of the present invention is substantially free of heavy metals such as lead.

The electrodepositable composition of the present invention may further comprise a hindered amine light stabilizer for added UV degradation resistance, but it is not required. Such hindered amine light stabilizers include those disclosed in U.S. Pat. No. 5,260,135. When they are used they are present in the electrodepositable composition in an amount of 0.1 to 2 percent by weight, based on the total weight of polymer solids in the electrodepositable composition.

The electrodepositable composition of the present invention is typically used in the form of an electrodeposition bath comprising the electrodepositable composition dispersed in an aqueous medium, primarily water. The electrodeposition bath typically has a polymer solids content usually within the range of about 5 to 25 percent by weight based on total weight of the electrodeposition bath.

Besides water, the aqueous medium of the electrodeposition bath may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol, propylene glycol and diethylene glycol. The amount of coalescing solvent is generally between about 0.01 and 25 percent and when used, preferably from about 0.05 to about 5 percent by weight based on total weight of the aqueous medium.

A pigment composition and other optional additives such as surfactants, wetting agents or catalyst can be included in the electrodeposition bath. The pigment composition may be of the conventional type comprising inorganic pigments, for example, iron oxides, china clay, carbon black, coal dust, titanium dioxide, talc, barium sulfate, as well as organic color pigments such as phthalocyanine green and the like. The pigment content of the dispersion is usually expressed as a pigment-to-polymer ratio. In the practice of the invention, when pigment is employed, the pigment-to-polymer ratio is usually within the range of about 0.02 to 1:1. The other additives mentioned above are usually in the dispersion in amounts of about 0.01 to 3 percent by weight based on weight of polymer solids.

The electrodepositable coating compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0, usually less than 0.5 microns, and typically less than 0.15 micron.

The concentration of the resinous phase in the aqueous medium is at least 1 and usually from 2 to 60 percent by weight based on total weight of the aqueous dispersion. When the compositions of the present invention are in the form of resin concentrates, they generally have a resin solids content of 20 to 60 percent by weight based on weight of the aqueous dispersion.

The curable electrodepositable coating compositions of the invention typically are supplied as two components: (1) a clear resin feed, which includes, generally, active hydrogen-containing, cationic polymer, i.e., the main film-forming polymer, the at least partially blocked polyisocyanate curing agent, and any additional water-dispersible, non-pigmented components; and (2) a pigment paste (described above), which, generally, includes one or more pigments, a water-dispersible grind resin which can be the same or different from the main-film forming polymer, and, optionally, additives such as catalysts, and wetting or dispersing aids. An electrodeposition bath is prepared by dispersing components (1) and (2) in an aqueous medium which comprises water and, usually, coalescing solvents. Alternatively, the electrodepositable compositions of the present invention can be supplied as one component compositions.

The electrodeposition bath will generally have a conductivity ranging from 1000 to 3000 microsiemens/cm when measured at 20 percent solids. Conductivity can be measured using an Accumet Model 50 pH and conductivity meter and a conductivity cell with a cell constant of 1.0. This device is available from Fisher Laboratory Products, Fisher Scientific of Pittsburgh, Pa.

As mentioned above, in one embodiment the present invention is directed to an improved process for coating an electroconductive substrate. The process comprises (a) electrophoretically depositing on the substrate any of the aqueous, curable electrodepositable coating compositions described above to form an electrodeposited coating over at least a portion of the substrate, and (b) heating the coated substrate to a temperature and for a time sufficient to cure the electrodeposited coating on the substrate. In a further embodiment the present invention is directed to an improved process for coating an electroconductive substrate. The process comprises (a) electrophoretically depositing on the substrate any of the aqueous, curable electrodepositable coating compositions described above to form an electrodeposited coating over at least a portion of the substrate, (b)

heating the coated substrate to a temperature and for a time sufficient to cure the electrodeposited coating on the substrate, (c) applying directly to the cured electrodeposited coating one or more pigment-containing coating compositions and/or one or more pigment-free coating compositions to form a top coat over at least a portion of the cured electrodeposited coating, and (d) heating the coated substrate of step (c) to a temperature and for a time sufficient to cure the top coat.

In the processes of the present invention, the curable electrodepositable coating composition can be electrophoretically deposited onto at least a portion of any of a variety of electroconductive substrates, including various metallic substrates. For example, suitable metallic substrates can include ferrous metals and non-ferrous metals. Suitable ferrous metals include iron, steel, and alloys thereof. Non-limiting examples of useful steel materials include cold-rolled steel, galvanized (i.e., zinc coated) steel, electrogalvanized steel, stainless steel, pickled steel, GALVANNEAL®, GALVALUME®, AND GALVAN® zinc-aluminum alloys coated upon steel, and combinations thereof. Useful non-ferrous metals include conductive carbon coated materials, aluminum, copper, zinc, magnesium and alloys thereof. Cold rolled steel also is suitable when pretreated with a solution such as a metal phosphate solution, an aqueous solution containing at least one Group IIIB or IVB metal, an organophosphate solution, an organophosphonate solution and combinations of the above as are discussed below. Combinations or composites of ferrous and non-ferrous metals can also be used.

The electrodepositable coating compositions of the present invention can be applied to either bare metal or pretreated metal. By "bare metal" is meant a virgin metal substrate that has not been treated with a pretreatment composition such as conventional phosphating solutions, heavy metal rinses and the like. Additionally, for purposes of the present invention, bare metal substrates can include a cut edge of a substrate that is otherwise treated and/or coated over the non-edge surfaces of the substrate.

Before any treatment or application of any coating composition, the substrate optionally may be formed into an object of manufacture. A combination of more than one metal substrate can be assembled together to form such an object of manufacture.

Also, it should be understood that as used herein, an electrodepositable composition or coating formed "over" at least a portion of a "substrate" refers to a composition formed directly on at least a portion of the substrate surface, as well as a composition or coating formed over any coating or pretreatment material which was previously applied to at least a portion of the substrate.

That is, the "substrate" upon which the coating composition is electrodeposited can comprise any of the above-described electroconductive substrates to which one or more pretreatment and/or primer coatings have been previously applied. For example, the "substrate" can comprise a metallic substrate and a weldable primer coating over at least a portion of the substrate surface. The electrodepositable coating composition described above is then electrodeposited and cured over at least a portion thereof. One or more top coating compositions as described in detail below can be subsequently applied over at least a portion of the cured electrodeposited coating.

For example, the substrate can comprise any of the foregoing electroconductive substrates and a pretreatment composition applied over at least a portion of the substrate, the pretreatment composition comprising a solution that contains one or more Group IIIB or IVB element-containing compounds or mixtures thereof solubilized or dispersed in a carrier medium, typically an aqueous medium. The Group IIIB and IVB elements are defined by the CAS Periodic Table of the Elements as shown, for example, in the Handbook of Chemistry and Physics, (60th Ed. 1980). Transition metal compounds and rare earth metal compounds typically are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof.

The pretreatment composition carrier also can contain a film-forming resin, for example, the reaction products of one or more alkanolamines and an epoxy-functional material containing at least two epoxy groups, such as those disclosed in U.S. Pat. No. 5,653,823. Other suitable resins include water soluble and water dispersible polyacrylic acids such as those as disclosed in U.S. Pat. Nos. 3,912,548 and 5,328,525; phenol-formaldehyde resins as described in U.S. Pat. No. 5,662,746, incorporated herein by reference; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449,415.

Further, non-ferrous or ferrous substrates can be pretreated with a non-insulating layer of organophosphates or organophosphonates such as those described in U.S. Pat. Nos. 5,294,265 and 5,306,526. Such organophosphate or organophosphonate pretreatments are available commercially from PPG Industries, Inc. under the trade name NUPAL®. Application to the substrate of a non-conductive coating, such as NUPAL, typically is followed by the step of rinsing the substrate with deionized water prior to the coalescing of the coating. This ensures that the layer of the non-conductive coating is sufficiently thin to be non-insulating. The pretreatment coating composition can further comprise surfactants that function as aids to improve wetting of the substrate. Generally, the surfactant materials are present in an amount of less than about 2 weight percent on a basis of total weight of the pretreatment coating composition. Other optional materials in the carrier medium include defoamers and substrate wetting agents.

Due to environmental concerns, the pretreatment coating composition can be free of chromium-containing materials, i.e., the composition contains less than about 2 weight percent of chromium-containing materials (expressed as $CrO_3$), typically less than about 0.05 weight percent of chromium-containing materials.

In a typical pre-treatment process, before depositing the pretreatment composition upon the surface of the metal substrate, it is usual practice to remove foreign matter from the metal surface by thoroughly cleaning and degreasing the surface. The surface of the metal substrate can be cleaned by physical or chemical means, such as by mechanically abrading the surface or cleaning/degreasing with commercially available alkaline or acidic cleaning agents which are well know to those skilled in the art, such as sodium metasilicate and sodium hydroxide. A non-limiting example of a suitable cleaning agent is CHEMKLEEN® 163, an alkaline-based cleaner commercially available from PPG Pretreatment and Specialty Products of Troy, Mich. Acidic cleaners also can be used. Following the cleaning step, the metal substrate is usually rinsed with water in order to remove any residue. The metal substrate can be air-dried using an air knife, by flashing off the water by brief exposure of the substrate to a high temperature or by passing the substrate between squeegee rolls. The pretreatment coating composition can be deposited upon at least a portion of the outer surface of the metal substrate. Preferably, the entire outer surface of the metal substrate is treated with the pretreatment composition. The thickness of the pretreatment film can vary, but is generally less than about 1 micrometer, preferably ranges from about 1 to about 500 nanometers, and more preferably ranges from about 10 to about 300 nanometers.

The pretreatment coating composition is applied to the surface of the metal substrate by any conventional application technique, such as by spraying, immersion or roll coating in a batch or continuous process. The temperature of the pretreatment coating composition at application is typically about 10° C. to about 85° C., and preferably about 15° C. to about 60° C. The pH of the preferred pretreatment coating composition at application generally ranges from about 2.0 to about 5.5, and is preferably about 3.5 to about 5.5. The pH of the medium may be adjusted using mineral acids such as hydrofluoric acid, fluoroboric acid, phosphoric acid, and the like, including mixtures thereof; organic acids such as lactic acid, acetic acid, citric acid, sulfamic acid, or mixtures thereof, and water soluble or water dispersible bases such as sodium hydroxide, ammonium hydroxide, ammonia, or amines such as triethylamine, methylethyl amine, or mixtures thereof.

Continuous processes typically are used in the coil coating industry and also for mill application. The pretreatment coating composition can be applied by any of these conventional processes. For example, in the coil industry, the substrate typically is cleaned and rinsed and then contacted with the pretreatment coating composition by roll coating with a chemical coater. The treated strip is then dried by heating, painted and baked by conventional coil coating processes.

Mill application of the pretreatment composition can be by immersion, spray or roll coating applied to the freshly manufactured metal strip. Excess pretreatment composition is typically removed by wringer rolls. After the pretreatment composition has been applied to the metal surface, the metal can be rinsed with deionized water and dried at room temperature or at elevated temperatures to remove excess moisture from the treated substrate surface and cure any curable coating components to form the pretreatment coating. Alternately, the treated substrate can be heated to a temperature ranging from 65° C. to 125° C. for 2 to 30 seconds to produce a coated substrate having a dried residue of the pretreatment coating composition thereon. If the substrate is already heated from the hot melt production process, no post application heating of the treated substrate is required to facilitate drying. The temperature and time for drying the coating will depend upon such variables as the percentage of solids in the coating, components of the coating composition and type of substrate.

The film coverage of the residue of the pretreatment composition generally ranges from 1 to 10,000 milligrams per square meter ($mg/m^2$), and is preferably 10 to 400 $mg/m^2$.

A layer of a weldable primer also can be applied to the substrate, whether or not the substrate has been pretreated. A typical weldable primer is BONAZINC®, a zinc-rich mill applied organic film-forming composition, which is commercially available from PPG Industries, Inc., Pittsburgh, Pa. BONAZINC typically is applied to a thickness of at least 1 micrometer and preferably to a thickness of 3 to 4 micrometers. Other weldable primers, such as iron phosphide-rich primers, are commercially available.

The electrodeposition process of the present invention typically involves immersing the electroconductive substrate into an electrodeposition bath of an aqueous electrodepositable composition, the substrate serving as a cathode in an electrical circuit comprising the cathode and an oppositely charged counter-electrode, i.e., an anode. Sufficient electrical current is applied between the electrodes to deposit a substantially continuous, adherent film of the electrodepositable coating composition onto the surface of the electroconductive substrate. Electrodeposition is usually carried out at a constant voltage in the range of from 1 volt to several thousand volts, typically between 50 and 500 volts. Maximum current density is usually between 1.0 ampere and 15 amperes per square foot (10.8 to 161.5 amperes per square meter) and tends to decrease quickly during the electrodeposition process, indicating formation of a continuous self-insulating film.

In the process of electrodeposition, the metal substrate being coated, serving as a cathode, and an electrically conductive anode are placed in contact with the cationic electrodepositable composition. Upon passage of an electric current between the cathode and the anode while they are in contact with the electrodepositable composition, an adherent film of the electrodepositable composition will deposit in a substantially continuous manner on the electroconductive substrate.

In one embodiment, the present invention is directed to an improved process for forming a photodegradation-resistant multi-layer coating on an electrically conductive substrate comprising (a) electrophoretically depositing on the substrate any of the aqueous, curable electrodepositable coating compositions described above to form an electrodeposited coating over at least a portion of the substrate, the substrate serving as a cathode in an electrical circuit comprising the cathode and an anode, the cathode and the anode being immersed in the aqueous electrodepositable coating composition, wherein electric current is passed between the cathode and the anode to cause the coating to be electrodeposited over at least a portion of the substrate; (b) heating the coated substrate at a temperature and for a time sufficient to cure the electrodeposited coating on the substrate; (c) applying directly to the cured electrodeposited coating one or more pigment-containing coating compositions and/or one or more pigment-free coating compositions to form a top coat over at least a portion of the cured electrodeposited coating; and (d) heating the coated substrate of step (c) to a temperature and for a time sufficient to cure the top coat. The improvement comprises the inclusion in the circuit of a non-ferrous anode, for example, anodes comprised of ruthenium oxide or carbon rods.

In most conventional cationic electrodeposition bath systems, the anode(s) are comprised of a ferrous material, for example, stainless steel. A typical cationic bath has an acidic pH ranging from 4 to 7, often from 5 to 6.5. However, in a typical electrodeposition bath system, the anolyte (i.e., the bath solution in the immediate area of the anode) can have a pH as low as 3.0 or less due to the concentration of acid at or near the anode. At these strongly acidic pH ranges, the ferrous anode can degrade, thereby releasing soluble iron into the bath. By "soluble iron" is meant $Fe^{2+}$ or $Fe^{3+}$ salts which are at least partially water soluble. During the electrodeposition process, the soluble iron is electrodeposited along with the resinous binder and is present in the cured electrodeposited coating. It has been found that the presence of iron in soluble form can contribute to interlayer delamination of subsequently applied top coat layers from the cured electrodeposited coating layer upon weathering exposure. In view of the foregoing, it is desirable that the electrodepositable coating composition of the present invention, when in the form of an electrodeposition bath, comprises less than 10 parts per million, typically less than 1 part per million of soluble iron. This can be accomplished by the inclusion in the circuit of a non-ferrous anode.

Once the above-described electrodepositable coating composition is electrodeposited over at least a portion of the electroconductive substrate, the coated substrate is heated to a temperature and for a time sufficient to cure the electrodeposited coating on the substrate. The coated substrate can be heated to a temperature ranging from 250° to 450° F. (121.1° to 232.2° C.), often from 275° to 400° F. (135° to 204.4° C.), and typically from 300° to 360° F. (149° to 180° C.). The curing time can be dependent upon the curing temperature as well as other variables, for example, film thickness of the electrodeposited coating, level and type of catalyst present in the composition and the like. For purposes of the present invention, all that is necessary is that the time be sufficient to effect cure of the electrodeposited coating on the substrate. For example, the curing time can range from 10 minutes to 60 minutes, and typically from 20 to 40 minutes.

In one embodiment of the present invention, the coated substrate is heated to a temperature of 360° F. (180° C.) or less for a time sufficient to effect cure of the electrodeposited coating on the substrate. The thickness of the resultant cured electrodeposited coating usually ranges from 15 to 50 microns.

As used herein, the term "cure" as used in connection with a composition, e.g., "a cured composition" shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network. For purposes of the present invention, a cured composition, when subjected to double rubs with a cloth soaked in acetone, will endure at least 100 double rubs without removing the coating.

In another embodiment, the present invention is directed to a process wherein any of the above-described electrodepositable coating compositions can be electrophoretically applied to an electroconductive substrate as in step (a), and heated in an atmosphere having 5 parts per million or less, typically 1 part per million or less, of nitrogen oxides ($NO_x$) to a temperature and for a time sufficient to cure the electrodeposited coating on the substrate as described above. The presence of $NO_x$ in the curing ovens can create an oxidizing atmosphere which can result in interlayer delamination between the cured electrodeposited coating and any subsequently applied top coats upon weathering exposure.

Nitrogen oxides can be formed during combustion of a hydrocarbon fuel, such as natural gas used to fuel gas-fired ovens. Nitrogen oxides can form as a result of two oxidation mechanisms: (1) reaction of nitrogen in the combustion air with excess oxygen (referred to as thermal $NO_x$) and (2) reaction of nitrogen that is chemically bound in the fuel (referred to as fuel $NO_x$). In addition, minor amounts of $NO_x$ are formed through complex interaction of molecular nitrogen with hydrocarbons in the early phase of the flame front (referred to as prompt $NO_x$). The quantity of $NO_x$ created when a fuel burns depends primarily on temperature, time, and turbulence variables. That is, flame temperature and the residence time of the fuel/air mixture, along with the nitrogen content of the fuel and the quantity of excess air used for combustion determine the $NO_x$ levels present in the curing oven atmosphere. By delaying the mixing of fuel and air, low $NO_x$ burners can reduce combustion temperatures, minimize initial turbulence, and retard the formation of $NO_x$ in the curing oven. Alternatively, electric curing ovens can be used.

Once the electrodeposited coating is cured on the substrate in step (b) of any of the processes of the present invention directed toward formation of multi-layer composite coatings, one or more pigment-containing coating compositions and/or one or more pigment-free coating compositions are applied directly to the cured electrodeposited coating. In the instance in which a single layer coating is desired, no topcoat application is necessary.

The use of a primer or primer-surfacer is unnecessary because of the improved photodegradation resistance afforded by the various compositions used in the process of the present invention. Suitable top coats (including base coats, clear coats, pigmented monocoats, and color-plus-clear composite compositions) include any of those known in the art, and each independently may be waterborne, solventborne, in solid particulate form, i.e., a powder coating composition, or in the form of a powder slurry. The top coat typically includes a film-forming polymer, crosslinking material and, if a colored base coat or monocoat, one or more pigments.

Non-limiting examples of suitable base coat compositions include waterborne base coats such as are disclosed in U.S. Pat. Nos. 4,403,003; 4,147,679; and 5,071,904. Suitable clear coat compositions include those disclosed in U.S. Pat. Nos. 4,650,718; 5,814,410; 5,891,981; and WO 98/14379.

The top coat compositions can be applied by conventional means including brushing, dipping, flow coating, spraying and the like, but they are most often applied by spraying. The usual spray techniques and equipment for air spraying and electrostatic spraying and either manual or automatic methods can be used. After application of each top coat to the substrate, a film is formed on the surface of the substrate by driving organic solvent and/or water out of the film by heating or by an air-drying period.

Typically, the thickness of a pigmented base coat ranges from about 0.1 to about 5 mils (about 2.54 to about 127 microns), and preferably about 0.4 to about 1.5 mils (about 10.16 to about 38.1 microns). The thickness of a clear coat usually ranges from about 0.5 to about 5 mils (about 12.7 to about 127 microns), preferably about 1.0 to about 3 mils (about 25.4 to about 76.2 microns).

The heating will preferably be only for a short period of time and will be sufficient to ensure that any subsequently applied top coating can be applied without any dissolution occurring at the coating interfaces. Suitable drying conditions will depend on the particular top coat composition and on the ambient humidity (if the top coat composition is waterborne), but in general a drying time of from about 1 to 5 minutes at a temperature of about 80° F. to 250° F. (20° C. to 121° C.) is used. Usually between coats, the previously applied coat is flashed, that is, exposed to ambient conditions for about 1 to 20 minutes.

After application of the top coat composition(s), the coated substrate is then heated to a temperature and for a period of time sufficient to effect cure of the coating layer(s). In the curing operation, solvents are driven off and the film-forming materials of the top coats are each crosslinked. The heating or curing operation is usually carried out at a temperature in the range of from 160° F. to 350° F. (71° C. to 177° C.) but if needed, lower or higher temperatures may be used as necessary to activate crosslinking mechanisms. Cure is as defined as above.

For purposes of the present invention, when cured, the top coats described above can have at least 0.1 percent light transmission as measured at 400 nanometers. The percent light transmission is determined by measuring light transmission of free cured top coat films ranging from 1.6 to 1.8 mils (40.64 to 45.72 micrometers) film thicknesses using a Perkin-Elmer Lambda 9 scanning spectrophotometer with a 150 millimeter Lap Sphere integrating sphere. Data is collected using Perkin-Elmer UV WinLab software in accordance with ASTM E903, *Standard Test Method for Solar Absorbance, Reflectance, and Transmittance of Materials Using Integrating Spheres*.

In one embodiment, the present invention is directed to a photodegradation resistant multi-layer composite coating comprising a cured primer coating layer over at least a portion of an electroconductive substrate, and a cured top coat layer over at least a portion of the cured primer layer. The primer coating layer is formed from any of the curable electrodepositable coating compositions described in detail above. The top coat layer can be formed from one or more pigment-containing coating compositions and/or one or more pigment-free coating compositions as described above and is characterized in that the multi-layer composite coating exhibits substantially no interlayer delamination between the cured primer coating layer and the cured top coat layer upon concentrated solar spectral irradiance exposure equivalent to two years outdoor weathering when the top coat layer has at least 80 percent light transmission as measured at 400 nanometers wavelength. Any of the above-described top coating compositions can be used to form the top coat layers of the photodegradation multi-layer composite coating, provided that when cured, the top coat layer has at least 80 percent light transmission as measured at 400 nanometers wavelength. Also, it should be obvious that the improved photodegradation resistance can be observed upon such concentrated solar spectral irradiance only if the cured electrodeposited primer coating has acceptable initial adhesion to the substrate, and the cured multi-layer composite coating exhibits acceptable initial interlayer adhesion. That is, the adhesion failure in such instances is obviously due to factors other than photodegradation of the cured electrodeposited coating.

As used herein, in the specification and in the claims, "concentrated solar irradiance exposure" equivalent to two years outdoor weathering is intended to mean accelerated exposure testing conducted in accordance with SAE J1961 which specifies ASTM G90-98, Standard Practice for Performing Accelerated Outdoor Weathering of Non metallic Materials Using Concentrated Natural Sunlight, Cycle 3, which utilizes fresnel solar concentrators using the EMMAQUA® (Equatorial Mount with Mirrors for Acceleration, with Water) test method, available through ATLAS Weathering Services Group, DSET Laboratories of Phoenix, Ariz. The accelerated exposure testing is conducted for a period of time and under conditions which correlate to two years outdoor weather exposure (as described in detail below). This method includes the use of a fresnel-reflecting system which employs ten flat first-surface mirrors to concentrate natural sun light onto coated test panel surfaces mounted on a target board. The high quality first-surface mirrors uniformly focus sunlight onto the test panel surfaces at an intensity of approximately eight times that of global daylight and approximately five times the global radiation in the ultraviolet spectrum. Test panels are sprayed with pure deionized water at pre-determined, regular intervals.

Testing parameters are governed by ISO 877, Plastics—Methods of Exposure to Direct Weathering, to Weathering Using Glass-filtered Daylight, and to Intensified Weathering by Daylight Using Fresnel Mirrors, and ASTM G90. EMMAQUA exposures are correlated to equivalent "year" of average desert (central Arizona) or subtropical (south Florida) total ultraviolet real-time exposure. For example, see correlation data presented in Bauer, D. R., "Chemical Approaches for Evaluating Automotive Materials and Test Methods," presented at the Advanced Symposium on Automotive Materials Testing, Scottsdale, Ariz., 1993; Bauer, D. R., Paputa Peck, M. C., and Carter, R. O., "Evaluation of Accelerated Weathering Tests for a Polyester-Urethane Coating Using Photoacoustic Infrared Spectroscopy," Journal of Coatings Technology, December 1987, Vol. 59, No. 755, pg. 103–109; Higgins, Dr. Richard J., "Powder Coatings, Focus on Usage Trends," Metal Architecture, September 1991, Vol. 7, No. 9, pg. 56–60 (FIG. 2); Keller, D. M., "Testing to Failure of Paint on Plastics," presented at the Advanced Coatings Technology Conference, Chicago, Ill., 1992, pg. 133–144; Wineburg, J. P., "Automotive Coatings and Stabilizers," presented at the Advanced Symposium on Automotive Materials Testing, Scottsdale, Ariz., 1993; and Zerlaut, G. A. and Robbins, J. S., "Accelerated Outdoor Exposure Testing of Coil Coatings by the EMMAQUA® Test Method," presented at the Advanced Coatings Technology Seminar, Detroit, Mich., 1991 (Table 4).

For purposes of the present invention, the concentrated solar spectral irradiance exposure correlates to two years south Florida at 45° outdoor exposure.

As was previously discussed, the transmission of visible and/or ultraviolet radiation through the cured topcoating layer(s) to the cured electrodeposited coating is known to cause photodegradation of the electrodeposited coating at the electrocoating/topcoating interface which can result in interlayer delamination of the topcoat layer from the electrocoat layer. Therefore, to ensure that the topcoat layer(s) have at least 80 percent light transmission measured at 400 nanometers wavelength, two clear top coat layers are typically formed over the electrodeposited primer layer. For purposes of testing, the two clear top coat layers are formed from a first or base coat layer which is substantially free of pigment followed by subsequent application of second or clear coat layer which is also substantially free of pigment.

Metal substrates coated by the process of the present invention can be expected to demonstrate excellent corrosion resistance as determined by salt spray corrosion resistance testing and excellent resistance to photodegradation. When topcoated with a basecoat and/or clearcoat system having at least 0.1 percent light transmission as measured at 400 nanometers wave length, the resulting multi-layer composite coating can be expected to exhibit substantially no interlayer delamination or adhesion loss between the cured electrodeposited coating and the subsequently applied top coating layers as determined in accordance with ASTM-3359-97, method B. Further, the multi-layer composite coating of the present invention can be expected to exhibit substantially no interlayer delamination or adhesion loss between the cured electrodeposited coating and the subsequently applied top coating layers upon concentrated solar spectral irradiance exposure equivalent to two years outdoor weathering when the top coating layer(s) have at least 80 percent light transmission as measured at 400 nanometers wavelength.

EXAMPLES

Example 1

This example describes the preparation of an aliphatic urethane crosslinker having pendant ketimine groups that can be converted to primary amine or amine salt groups. The crosslinker was used as a component in the electrodepositable coating composition of Example 1A below. The ketimine functional urethane curing agent was prepared as described below from the following ingredients:

| Ingredients | Parts by Weight (in grams) |
| --- | --- |
| Isophorone diisocyanate | 1288 |
| Methylisobutyl ketone | 203 |
| Dibutyltin dilaurate | 3.2 |
| Trimethylolpropane | 104 |
| Tridecyl alcohol | 160 |
| Methylisobutyl ketone | 191 |
| MACOL ® 98B[1] | 626 |
| Methylisobutyl ketone | 73 |
| 2-Butoxyethanol | 428 |
| Ketimine[2] | 397 |
| 2-Butoxyethanol | 65 |

[1]Reaction product of bisphenol A and ethylene oxide reacted in a ratio of 1:6, available from BASF Surfactants.
[2]An 80% solution of the reaction product of diglycolamine and methylisobutyl ketone in methylisobutyl ketone.

The isophorone diisocyanate, the first charge of methylisobutyl ketone, and dibutyltindilaurate were charged to a 5 liter flask under nitrogen. Trimethylolpropane was then added and the contents warmed to a temperature of 30° C. The temperature increased from 30° C. to 77° C. following the addition of the trimethylolpropane. Tridecyl alcohol then was added dropwise over a period of twenty minutes, followed by the addition of the second charge of methylisobutyl ketone. The MACOL 98B was then added dropwise over a period of twenty minutes, followed by the third charge of methylisobutyl ketone. The solution was held at a temperature of 70° C. for 15 minutes. 2-butoxyethanol was then added over a period of 60 minutes while maintaining a temperature of less that 85° C. The ketimine was added to the solution and and the reaction mixture was held at 85° C. for one hour. The second amount of 2-Butoxyethanol was added and after blending for 60 minutes, infrared analysis indicated the disappearance of isocyanate. The solution had a theoretical non-volatile content of 79%.

Example 2

This example describes the preparation of an aliphatic urethane crosslinker having pendant ketimine groups that can be converted to primary amine or amine salt groups. The crosslinker was used as a component in the electrodepositable coating composition of Example 2B below. The ketimine functional urethane curing agent was prepared as described below from the following ingredients:

| Ingredients | Parts by Weight (in grams) |
| --- | --- |
| Isophorone diisocyanate | 888.0 |
| Methylisobutyl ketone | 140.0 |
| Dibutyltin dilaurate | 2.2 |
| Trimethylolpropane | 71.5 |
| Tridecyl alcohol | 110.6 |
| Methylisobutyl ketone | 60.3 |
| MACOL ® 98A | 432.0 |
| Methylisobutyl ketone | 50 |
| 2-Butoxyethanol | 259.8 |
| Diketimine[1] | 333.0 |
| 2-Butoxyethanol | 113.2 |

[1]A 71 percent solution of the reaction product of diethylene triamine and methylisobutyl ketone in methylisobutyl ketone.

The isophorone diisocyanate, the first charge of methylisobutyl ketone, and dibutyltindilaurate were charged to a 3-liter flask under nitrogen. The admixture was heated to a temperature of 55° C. The trimethylolpropane was then added. After an initial exotherm, the reaction mixture temperature was adjusted to 80° C. and held at that temperature for 15 minutes. The reaction mixture was then cooled to 70° C. and the tridecyl alcohol was added over a period of about 15 minutes. After the addition was complete, the mixture was held for 15 minutes, at which time the second charge of methylisobutyl ketone was added. The mixture was then cooled to 70° C. and the MACOL 98A was added in one portion, followed by the third charge of methylisobutyl ketone. Cooling was applied as necessary to maintain the temperature below 90° C. After a 30-minute hold period, the solution was cooled to 70° C. To the reaction mixture was then added the first charge of 2-butoxyethanol at such a rate that a reaction temperature of 85° C. was not exceeded. After completion of the addition, the temperature was adjusted to 80° C. and maintained for 30 minutes. The diketimine then was added in one portion. Following the exotherm, the temperature was adjusted to 80° C. and maintained for 45 minutes, at which time, infrared analysis indicated the presence of residual isocyanate functionality. The final charge of 2-butoxyethanol was added in one portion. The reaction mixture was held at 80° C. until infrared analysis indicated that the isocyanate had been completely consumed. The solution had a non-volatile content of 83.0%.

Example 3

This example describes the preparation of an aliphatic urethane crosslinker. The crosslinker was used as a component in the electrodepositable coating composition of Example 1A below. The neutral urethane curing agent was prepared as described below from the following ingredients:

| Ingredients | Parts by Weight (in grams) |
| --- | --- |
| Isophorone diisocyanate | 888.0 |
| Methylisobutyl ketone | 140.0 |
| Dibutyltin dilaurate | 2.2 |
| Trimethylolpropane | 71.5 |
| Tridecyl alcohol | 110.6 |

-continued

| Ingredients | Parts by Weight (in grams) |
|---|---|
| Methylisobutyl ketone | 132.0 |
| MACOL 98A | 432.0 |
| Methylisobutyl ketone | 50 |
| 2-Butoxyethanol | 502.8 |
| Methylisobutyl ketone | 170.8 |

The isophorone diisocyanate, the first charge of methylisobutyl ketone, and dibutyltin dilaurate were charged to a 3-liter flask under nitrogen. The admixture was heated to a temperature of 55° C., at which time the trimethylolpropane was added. After an initial exotherm, the temperature of the reaction mixture was adjusted to 80° C. and maintained for 15 minutes. The reaction mixture was then cooled to 70° C. and the tridecyl alcohol was added over a period of about 15 minutes. After the addition, the mixture was held at 70° C. for 15 minutes, then the second charge of methylisobutyl ketone was added. The reaction mixture was then cooled to 70° C. and the MACOL 98A was added in one portion, followed by the third charge of methylisobutyl ketone. Cooling was applied as necessary to maintain the temperature below 90° C. After a 30-minute hold period, the reaction mixture was cooled to 70° C. To the reaction mixture was then added the 2-butoxyethanol at such a rate that a temperature of 85° C. was not exceeded. After the addition was completed, the temperature was adjusted to 80° C. until infrared analysis indicated that the isocyanate was completely consumed. The final charge of methylisobutyl ketone then was added under agitation. The final product had a theoretical non-volatile content of 78.7%.

Example 4

This example describes the preparation of a cationic amine salt group-containing urethane crosslinker dispersion. The crosslinker was used as a component in the electrodepositable resin composition of Example C below. The curing agent was prepared as described below from the following ingredients:

| Ingredients | Parts by Weight (in grams) |
|---|---|
| Isophorone diisocyanate | 888.0 |
| Methylisobutyl ketone | 200 |
| Dibutyltin dilaurate | 1.6 |
| 2-Butoxyethanol | 472 |
| Trimethylolpropane | 98.3 |
| POLYMEG ® 650[1] | 375 |
| Diketimine of Example 2 | 243 |
| Methylisobutyl ketone | 193 |
| Sulfamic acid | 79.2 |
| Deionized water | 683 |

[1]650 molecular weight polytetrahydrofuran available from BASF Corporation.

Isophorone diisocyanate, the first charge of methylisobutyl ketone, and dibutyltindilaurate were added to a round bottom flask and heated to a temperature of 50° C. The 2-butoxyethanol was added over a period of 60 minutes while maintaining a temperature below 100° C. The reaction mixture was then cooled to 70° C. and the trimethylolpropane was added in two portions. Upon completion of the second addition of trimethylolpropane, the reaction mixture had exothermed to approximately 90° C. The mixture was then heated to 100° C. and held at that temperature for 30 minutes. After the 30-minute hold period, the resin was cooled to a temperature of 85° C. and the POLYMEG 650 was added over a period of 30 minutes. Upon completion of this addition, the diketimine was added to the reaction mixture over a period of 15 minutes. During a one-hour hold at 100° C., the reaction mixture was monitored by infrared spectroscopy for the disappearance of isocyanate groups. The polymeric material was then diluted with the remaining methylisobutyl ketone and dispersed under agitation into a solution of the sulfamic acid and deionized water. The solution had a theoretical non-volatile content of 65.4%.

Example 5

This example describes the preparation of a neutral aliphatic urethane crosslinker. The crosslinker was used as a component in the electrodepositable resin composition of Example D below. The urethane curing agent was prepared as described below from the following ingredients:

| Ingredients | Parts by Weight (in grams) |
|---|---|
| Isophorone diisocyanate | 888.0 |
| Methylisobutyl ketone | 200 |
| Dibutyltin dilaurate | 1.6 |
| 2-Butoxyethanol | 472 |
| Trimethylolpropane | 98.3 |
| POLYMEG 650 | 375 |
| 2-Butoxyethanol | 76 |
| Methylisobutyl ketone | 440 |

Isophorone diisocyanate, the first charge of methylisobutyl ketone, and dibutyltindilaurate were added to a round bottom flask and heated to 50° C. The first charge of 2-butoxyethanol was added over a period of 60 minutes while maintaining a temperature below 100° C. The mixture was then cooled to 70° C. and the trimethylolpropane was added in two portions. Upon completion of the second addition of trimethylolpropane, the mixture had exothermed to approximately 90° C. The mixture was then heated to 100° C. and held at that temperature for 30 minutes. The mixture then was cooled to 85° C. and the POLYMEG 650 was added over a period of 30 minutes. Upon completion of this addition, 2-butoxyethanol was added over a period of 15 minutes. The reaction mixture was maintained for one hour at 100° C., at which time, the reaction mixture was found by infrared analysis to have no remaining isocyanate groups. The polymeric material was then diluted with the remaining charge of methylisobutyl ketone. The solution had a non-volatile content of 76.7% (one hour at 100° C.).

Resin Examples

Example A

This example describes the preparation of an electrodepositable sulfonium group-containing epoxy resin. The resin was used as a component in the electrodepositable coating compositions of Examples 1A and 3A below. The sulfonium functional epoxy resin was prepared as described below from the following ingredients:

| Ingredients | Parts by Weight (in grams) |
| --- | --- |
| EPON ® 828[1] | 1000.0 |
| Bisphenol A | 374.3 |
| Nonyl Phenol | 36.0 |
| Ethyltriphenylphosphonium Iodide | 1.3 |
| DOWANOL ® PnB[2] | 378.1 |
| DOWANOL ® PM[3] | 94.5 |
| Thiodiethanol | 229.0 |
| Dimethylolpropionic Acid | 251.3 |
| Deionized Water | 57.4 |
| Deionized Water | 1762.9 |
| Deionized Water | 1513.1 |

[1]Diglycidyl ether of bisphenol A having an epoxy equivalent weight of 188, commercially available from Resolution Performance Products
[2]n-Butoxypropanol solvent commercially available from Dow Chemical Co.
[3]n-Methoxypropanol solvent commercially available from Dow Chemical Co.

The EPON 828, bisphenol A, nonyl phenol and DOWANOL PnB were charged to a reaction vessel, heated to 111° C. and maintained at that temperature until the bisphenol A was dissolved. The ethyltriphenylphosphonium iodide was then added and the reaction mixture was heated to a temperature of 120° C. to initiate the epoxy advancement reaction. The reaction mixture was allowed to exotherm to a temperature ranging from 170 to 180° C. and was held at 170 to 175° C. for one hour. The DOWANOL PM was then added and the reaction mixture was cooled to 80° C., followed by addition of the thiodiethanol, the first charge of deionized water and the dimethylolpropionic acid. The reaction mixture was then heated to a temperature of 70° C. to 80° C. and held at this temperature until an acid value of less than 3 was obtained. At this point the resin was dispersed into the second charge of deionized water which having a temperature ranging from 20° C. to 25° C. After mixing for 20 minutes, the dispersion was diluted with the final charge of deionized water. The dispersion had a non-volatile content of 32% (one hour at 110° C.).

Example B

This example describes the preparation of an electrodepositable sulfonium group-containing epoxy resin. The resin was used as a component in the electrodepositable coating compositions of Example 2B below. The sulfonium functional epoxy resin was prepared as described below from the following ingredients:

| Ingredients | Parts by Weight (in grams) |
| --- | --- |
| EPON 828 | 1000.0 |
| Bisphenol A | 442.3 |
| Nonyl Phenol | 147.4 |
| EthylTriphenylphosphonium Iodide | 1.4 |
| DOWANOL PnB | 213.1 |
| DOWANOL PnB | 145.3 |
| DOWANOL PM | 89.3 |
| Thiodiethanol | 97.0 |
| Dimethylolpropionic Acid | 106.6 |
| Deionized Water | 24.4 |
| Deionized Water | 1718.4 |
| Deionized Water | 1449.1 |

The EPON 828, bisphenol A, nonyl phenol and the first portion of DOWANOL PnB were charged to a reaction vessel, heated to 111° C. and held at that temperature until the bisphenol A was dissolved. The ethyltriphenylphosphonium iodide was then added and the reaction mixture was heated to 120° C. to initiate the epoxy advancement reaction. The reaction mixture was allowed to exotherm to a temperature ranging from 170° C. to 180° C. and was held at 170° C. to 175° C. for one hour. The second portion of DOWANOL PnB and the DOWANOL PM was then added, and the reaction mixture was cooled to 80° C. followed by the addition of the thiodiethanol, the first charge of deionized water and the dimethylolpropionic acid. The reaction mixture was heated to a temperature of 78° C. to 80° C. and held at this temperature until an acid value of less than 3 was obtained. The resin then was dispersed into the second charge of deionized water at a temperature of 20° C. to 25° C. After mixing for 20 minutes, the dispersion was reduced to the proper solids with the final charge of deionized water. The dispersion had a non-volatile content of 33% (one hour at 110° C.).

Example C

This example describes the preparation of an electrodepositable sulfonium group-containing acrylic resin having a cationic amine salt-containing urethane crosslinker described in Example 4 above admixed with the resin. The resin was used as a component in the electrodepositable coating compositions of Examples 4C below. The sulfonium functional acrylic resin was prepared as described below from the following ingredients:

| Ingredients | Parts by Weight (in grams) |
| --- | --- |
| DOWANOL ® DB[1] | 92.8 |
| DOWANOL PM | 6.3 |
| Deionized water | 3.4 |
| TINUVIN ® 1130[2] | 3.5 |
| Butyl acrylate | 47.2 |
| Hydroxypropyl methacrylate | 15.8 |
| LUPERSOL ® 555[3] | 0.3 |
| Butyl acrylate | 116.6 |
| Styrene | 81.9 |
| Hydroxypropyl methacrylate | 78.8 |
| Methyl methacrylate | 220.5 |
| Glycidyl methacrylate | 69.3 |
| Alpha-methylstyrene dimer | 6.3 |
| LUPERSOL 555 | 7.6 |
| DOWANOL DB | 22.7 |
| LUPERSOL 555 | 8.9 |
| DOWANOL DB | 10.1 |
| Thiodiethanol | 112.8 |
| Lactic acid, 88% in water | 22.2 |
| 12-Hydroxystearic acid | 13.9 |
| Deionized water | 25.1 |
| Urethane crosslinker of Example 4 | 512 |
| Dibutyltin diacetate | 6.7 |
| MAZON ® 1651[4] | 14.9 |
| Deionized water | 1688.0 |
| Sulfonium epoxy resin[5] | 221.2 |
| Deionized water | 854.0 |

[1]Diethylene glycol n-butyl ether solvent available from Dow Chemical Co.
[2]Ultraviolet light stabilizer, commercially available from Ciba-Geigy.
[3]A radical initiator, commercially available from Atofina.
[4]A plasticizer, commercially available from BASF Corporation.
[5]Preparation described in U.S. Pat. No. 4,715,898, column 6, example 2.

The first charge of DOWANOL DB, DOWANOL PM, the first charge of water, and TINUVIN 1130 were added to a round bottom flask. After heating to 140° C., a mixture of the first charge of butyl acrylate, the first charge of hydroxypropyl methacrylate, and the first charge of LUPERSOL 555 was added to the flask over a period of 30 minutes. Following a 30-minute hold, a second mixture of the remainder of the butyl acrylate, styrene, the remainder of the hydroxypropyl methacrylate, methyl methacrylate, glycidyl methacrylate, alpha-methylstyrene dimer, LUPERSOL 555, and the second charge of DOWANOL DB was added over a period of 150 minutes. Following a 30-minute hold at approximately 140° C., a mixture of LUPERSOL 555 and DOWANOL DB was added over a period of 15 minutes and the solution was allowed to mix at a temperature ranging from 135° C. to 145° C. for an additional 30 minutes. The resin was then allowed to cool to a temperature of 90° C. and a mixture of thiodiethanol, lactic acid, 12-hydroxystearic acid, and the second charge of water was quickly added to the flask. The reaction mixture was maintained at 80° C. for a period of five hours, at which time the epoxy functionality was essentially consumed. The urethane crosslinker of Example 4, dibutyltin diacetate, and MAZON 1651 were then added under agitation. The resin was stirred for 20 minutes and was then dispersed into a mixture of the third charge of deionized water and the sulfonium epoxy resin. After mixing for 30 minutes, the resin was further diluted with the remaining deionized water. The dispersion had a non-volatile content of 22.5% (one hour at 110° C.).

Example D

This example describes the preparation of an electrodepositable sulfonium group-containing acrylic resin having a neutral urethane crosslinker described in Example 5 above admixed with the resin. The resin was used as a component in the electrodepositable coating compositions of Examples 5D below. The sulfonium functional acrylic resin was prepared as described below.

The acrylic resin was prepared in the same manner as in Example C, except 452.2 parts by weight of the urethane crosslinker of Example 5 was used in place of the crosslinker of Example 4. The dispersion had a non-volatile content of 26.4%.

Electrodeposition Bath Examples

Example 1A

This example describes the preparation of an electrodepositable coating composition (in the form of an electrodeposition bath) using a sulfonium salt-containing epoxy resin described above in Example A, and a cationic amine salt-containing urethane crosslinker described in Example 1 above. The electrodepositable coating composition was prepared as described below from the following ingredients:

| Ingredients | Parts by Weight (in grams) |
| --- | --- |
| Sulfamic acid, 15% in deionized water | 71.3 |
| Urethane crosslinker of Example 1 | 345.4 |
| Deionized water | 400 |
| Resin of Example A | 1057 |
| Deionized water | 600 |
| JEFFAMINE ® adduct[1] | 133.5 |
| MAZON ® 1651 | 27.7 |
| E-6251[2] | 237.7 |

[1]A polyepoxidepolyoxyalkylene diamine adduct, prepared as described in U.S. Pat. No. 5,096,556, Example H.
[2]A gray pigment dispersion available from PPG Industries, Inc.

The sulfamic acid solution, crosslinker of Example 1, and first charge of deionized water were added to the sulfonium epoxy dispersion of Example A and mixed for 20 minutes. The second charge of water was added and the dispersion stirred in an open container for three days. The JEFFAMINE adduct and MAZON 1651 were mixed until uniform, diluted with about 150 grams deionized water, and added to the dispersion. The pigment dispersion E-625 1 was added along with additional deionized water to increase the volume of the bath to 3.8 liters, completing the electrocoat bath formulation. The bath had a pH of 6.2 and a conductivity of 1860 microsiemens/cm (µS/cm).

Example 2B

This example describes the preparation of an electrodepositable coating composition using a sulfonium salt-containing epoxy resin described above in Example B and a cationic amine salt-containing urethane crosslinker described in Example 2 above. The electrodepositable coating composition was prepared as described below from the following ingredients:

| Ingredients | Parts by Weight (in grams) |
| --- | --- |
| Sulfamic acid, 15% in deionized water | 115.2 |
| Urethane crosslinker of Example 2 | 375 |
| Deionized water | 410.5 |
| Resin of Example B | 961.2 |
| Deionized water | 600 |
| JEFFAMINE adduct of Example 1A | 133.5 |
| MAZON 1651 | 27.7 |
| E-6251 | 237.7 |

The aqueous solution of sulfamic acid was added to the crosslinker of Example 2, mixed and diluted with the first charge of deionized water to yield a white, partially translucent dispersion with a theoretical resin solids content of 33.3%. 831.8 grams of this solubilized crosslinker dispersion were added to the sulfonium epoxy dispersion of Example B under agitation and mixed for 10 minutes. The additional deionized water then was added to increase the volume to approximately 2.5 liters, and the dispersion was mixed under mild agitation in an open container for three days. The JEFFAMINE adduct and MAZON 1651 were mixed separately until uniform, diluted with 150 grams deionized water, and added to the dispersion. The pigment dispersion E-6251 was added along with additional deionized water to increase the volume of the bath to 3.8 liters. The bath had a pH of 6.6 and a conductivity of 1560 µS/cm.

Comparative Example 3A

This comparative example describes the preparation of an electrodepositable coating composition in the form of an electrodeposition bath using a sulfonium salt-containing epoxy resin described above in Example A and a neutral urethane crosslinker described in Example 3 above. The electrodepositable coating composition was prepared as described below from the following ingredients:

| Ingredients | Parts by Weight (in grams) |
| --- | --- |
| Urethane crosslinker of Example 3 | 346.2 |
| JEFFAMINE adduct of Example 1A | 133.5 |
| MAZON 1651 | 27.7 |
| Sulfamic acid, 10% in deionized water | 17.3 |
| Resin of Example A | 1057 |

-continued

| Ingredients | Parts by Weight (in grams) |
| --- | --- |
| Deionized water | 1000 |
| E-6251 | 237.7 |

The crosslinker of Example 3, the JEFFAMINE adduct, the MAZON 1651, and the aqueous sulfamic acid were added to the sulfonium epoxy resin dispersion of Example A and mixed for 20 minutes. Deionized water was added and the dispersion stirred in an open container for three days. The pigment dispersion E-6251, was added along with additional deionized water to increase the volume of the bath to 3.8 liters. The bath had a pH of 5.3 and a conductivity of 1070 $\mu$S/cm.

Example 4C

This example describes the preparation of an electrodepositable coating composition in the form of an electrodeposition bath using a sulfonium salt-containing acrylic resin described above in Example C, which contains a cationic amine salt-containing urethane crosslinker. The electrodepositable coating composition was prepared as described below from the following ingredients:

| Ingredients | Parts by Weight (in grams) |
| --- | --- |
| CP-407[1] | 648.1 |
| Deionized water | 100 |
| Acrylic resin of Example C | 2384.7 |
| Deionized water | 667.2 |

[1]A white pigment paste available from PPG Industries, Inc.

The CP-407 pigment paste and first charge of deionized water were combine and stirred thoroughly. This was added to the acrylic resin of Example C with agitation. The remainder of the deionized water was then added to give a paint bath with a pH of 5.7 and conductivity of 1418 $\mu$S/cm.

Comparative Example 5D

This comparative example describes the preparation of an electrodepositable coating composition in the form of an electrodeposition bath using a sulfonium salt-containing acrylic resin described above in Example D which contains a neutral urethane crosslinker. The electrodepositable coating composition was prepared as described below from the following ingredients:

| Ingredients | Parts by Weight (in grams) |
| --- | --- |
| CP-407 | 648.1 |
| Deionized water | 100 |
| Acrylic resin of Example D | 1991 |
| Deionized water | 1060.9 |

The CP-407 pigment paste and first charge of deionized water were combine and stirred thoroughly. This was added to the acrylic resin of Example D with agitation. The remainder of the deionized water was then added to give a paint bath with a pH of 5.12 and conductivity of 720 $\mu$S/cm.

Testing Procedures

The electrodepositable coating compositions of Example 1A through 5D were evaluated for throw power. In the test procedure, two 4 inch by 12 inch phosphated steel test panels were separated by a plastic spacer (4 mm thick and 10 mm wide) which was placed between the panels at the edges, such that a narrow cavity was formed between the two panels. When held vertically, the panel/spacer assembly was open at the bottom and contained a cavity having the dimensions 4 mm×80 mm along the full 12 inch length of the panel. To ensure that the cavity was tightly sealed, the panel edges were sealed with vinyl tape or alternatively, the panel/spacer combination was clamped together at the edges with plastic clamps.

The panel/spacer assembly was immersed in each of the bath compositions to a controlled depth to compare electrodeposition baths for throwpower. The panel/spacer assembly was connected to the cathode of the electrodeposition cell, taking precaution that both steel panels were in contact with the cathode.

The panel assembly was not sealed at the top so that the electrodeposition bath could fill the internal cavity readily when immersed in the bath. Since the only electrical access of the bath to the metal surfaces inside the cavity is through the 4 mm×80 mm gap at the bottom of the assembly, the conduction of electrical current through the bath and into the cavity can illustrate for the effective electrodeposition of coating onto the inside surfaces.

To test the throwpower of the electrodeposition baths, the test baths were placed in a plastic tube having a diameter of 12 cm and an internal height of 38 cm, which was equipped with a stainless steel heating/cooling coil connected to the anode of the electrodeposition cell, and a magnetic stirrer.

In choosing the electrodeposition conditions for the panel/spacer assembly, it should be understood that the voltage, time, and bath temperature can affect throw power, and can be chosen to represent realistic coating conditions for the bath which will result in the desired baked film thickness on the exterior surfaces of the panels. The electrodeposition time will usually be dictated by what is realistic for the use of electrodeposition coatings in mass production, which is typically in the range of two to three minutes.

The panel surfaces from the interior of the assembly were evaluated by visually observing the border between organic coated metal and uncoated metal on the cured panels. Throw power and is measured as the distance from the bottom of the panel to this visible border, and is reported below in centimeters (cm). Also, throw power is reported as a percentage, determined by relating the interior surface coating height divided by the panel immersion depth.

The panel/spacer assembly was connected to the cathode and direct current applied to it using the coating conditions in Tables 1 and 2 below. The voltage was raised gradually to the set point, keeping the amperage under about 2 amps for the epoxy baths, 3 amps for the acrylic baths. After completion of the electrodeposition process, the panel/spacer assembly was removed from the bath, spray rinsed on the outside with deionized water, and disassembled. After spray rinsing both sides of each panel with deionized water, the panels were hung vertically for at least 10 minutes at room temperature, and then baked for 30 minutes at 350° F. in an electric oven.

TABLE 1

|  | Example 1A | Example 2B | Example 2B Alternate coat-out conditions | Example 3A (Comparative) |
|---|---|---|---|---|
| pH | 6.2 | 6.6 | 6.6 | 5.3 |
| Conductivity (μS/cm) | 1860 | 1560 | 1560 | 1070 |
| Metal substrate | APR-31611[1] | APR-31611 | APR-31611 | APR-31611 |
| Immersion depth of panel/spacer assembly | 27 cm | 27 cm | 27 cm | 27 cm |
| Voltage | 275 | 275 | 250 | 275 |
| Temperature (° F.) | 90 | 80 | 90 | 90 |
| Time of coatout (minutes) | 2.5 | 2.5 | 2.5 | 2.5 |
| Outside film thickness (mils) | 0.99 | 0.88 | 1.54 | 1.11 |
| Total throw power (cm) | 15.6 | 20.4 | 18.7 | 12.4 |
| Total throw power (%) | 58 | 76 | 69 | 46 |

[1]Phosphated electrogalvanized steel panels, available from A.C.T. Laboratories, Hillsdale, Michigan.

TABLE 2

|  | Example 4C | Example 4C | Example 5D (Comparative) | Example 5D |
|---|---|---|---|---|
| pH | 5.70 | 5.70 | 5.12 | 5.12 |
| Conductivity (μS/cm) | 1418 | 1418 | 720 | 720 |
| Metal substrate | B952P95[1] | B952P95 | B952P95 | B952P95 |
| Immersion depth of panel/spacer assembly | 26 cm | 26 cm | 26 cm | 26 cm |
| Voltage | 300 | 275 | 300 | 275 |
| Temperature (° F.) | 90 | 95 | 90 | 95 |
| Time of coatout (minutes) | 3 | 3 | 3 | 3 |
| Outside film thickness (mils) | 1.01 | 1.01 | 1.09 | 1.11 |
| Total throw power (cm) | 21.84 | 20.80 | 18.72 | 17.94 |
| Total throw power (%) | 84% | 80% | 72% | 69% |

[1]Spray-applied zinc phosphated cold rolled steel with non chrome sealer, available from A.C.T. Laboratories, Hillsdale, Michigan.

We claim:

1. A process for coating an electroconductive substrate comprising the following steps:
   (a) electrophoretically depositing on the substrate a curable electrodepositable coating composition to form an electrodeposited coating over at least a portion of the substrate, the electrodepositable coating composition comprising a resinous phase dispersed in an aqueous medium, said resinous phase comprising:
       (i) one or more ungelled, active hydrogen-containing cationic sulfonium salt group-containing resins which are electrodepositable on a cathode, and
       (ii) one or more aliphatic polyisocyanate curing agents comprising cationic amine salt groups or groups which are capable of forming cationic amine salt groups derived from one or more primary amine groups;
   (b) heating the coated substrate to a temperature and for a time sufficient to cure the electrodeposited coating on the substrate;
   (c) applying directly to the cured electrodeposited coating one or more pigment-containing coating compositions and/or one or more pigment-free coating compositions to form a top coat over at least a portion of the cured electrodeposited coating; and
   (d) heating the coated substrate of step (c) to a temperature and for a time sufficient to cure the top coat.

2. The process of claim 1, wherein the cured top coat has from 0.1 to 50 percent light transmission measured at 400 nanometers.

3. The process of claim 1, wherein the active hydrogen-containing cationic sulfonium salt-containing resin (i) is selected from a polyepoxide polymer, an acrylic polymer, a polyurethane polymer, a polyester polymer, copolymers thereof and combinations thereof.

4. The process of claim 1, wherein the resin (i) comprises a polyepoxide polymer.

5. The process of claim 1, wherein the resin (i) comprises an acrylic polymer.

6. The process of claim 1, wherein the curing agent (ii) comprises an at least partially blocked aliphatic polyisocyanate selected from the group consisting of 1,6-hexamethylene diisocyanate, isophorone diisocyanate, bis-(isocyanatocyclohexyl)methane, polymeric 1,6-hexamethylene diisocyanate, trimerized isophorone diisocyante, norbornane diisocyanate, and mixtures thereof.

7. The process of claim 1, wherein the curing agent (ii) comprises an at least partially blocked aliphatic polyisocyanate comprising one or more pendant basic amine groups.

8. The process of claim 7, wherein the pendant amine groups are capable of being protonated at a pH greater than or equal to 4.

9. The process of claim 8, wherein the pendant amine groups are capable of being protonated at a pH greater than or equal to 5.

10. The process of claim 1, wherein the curing agent (ii) comprises a blocked polyisocyanate essentially free of tertiary amine groups.

11. The process of claim 1, wherein the nitrogen derived from the amine salt groups of curing agent (ii) is present in the cured electrodeposited film of step (b).

12. The process of claim 11, wherein the nitrogen derived from the amine salt groups of curing agent (ii) is substantially consumed in step (b) to form urea groups.

13. The process of claim 1, wherein the curing agent (ii) is at least partially blocked with at least one blocking agent selected from the group consisting of an alkyl alcohol, a 1,2-alkane diol, a 1,3-alkane diol, a benzylic alcohol, an allylic alcohol, an oxime, a glycol ether, caprolactam, a dialkylamine, and mixtures thereof.

14. The process of claim 1, wherein the curing agent (ii) comprises cationic amine salt groups derived from at least one compound selected from ethanolamine, propanolamine, 4-amino-1-butanol and 5-amino-1-pentanol, diglycolamine, 2-amino-2-methyl-1-propanol, 2-(2-aminoethylamino) ethanol, 2-(3-aminopropylamino)ethanol, aminoethylpiperazine, N-propylethylenediamine, N-methylpropanediamine, diethylenetriamine, 1,3-diamino-2-hyroxypropane, triethylene tetramine and higher homologs, and the reaction product of a primary amine in the form of a ketimine which also contain at least one active hydrogen group with an epoxide such as ethylene oxide or propylene oxide.

15. The process of claim 14, wherein the curing agent (ii) comprises cationic amino salt groups derived from diglycolamine, ethanolamine, diethylenetriamine, 2-(2-aminoethylamino)ethanol, and 2-amino-2-methyl-1-propanol.

16. The process of claim 1, wherein said electrodepositable coating composition is in the form of an electrodeposition bath having conductivity 1000 to 3000 microsiemens/cm at 20 percent solids.

17. The process of claim 1, wherein the coated substrate of step (a) is heated to a temperature ranging from 275° to 400° F. (135° to 204.4° C.).

18. The process of claim 1, wherein the electrodepositable coating composition is free of lead compounds.

19. The process of claim 1, wherein the coated substrate of step (a) is heated in an atmosphere having 5 parts per million or less of $NO_x$ to a temperature and for a time sufficient to cure the electrodeposited coating on the substrate.

20. A process for forming a photodegradation-resistant multi-layer coating on an electroconductive substrate comprising the following steps:
(a) electrophoretically depositing on the substrate a curable electrodepositable coating composition to form an electrodeposited coating over at least a portion of the substrate, the electrodepositable coating composition comprising a resinous phase dispersed in an aqueous medium, said resinous phase comprising:
(i) one or more ungelled, active hydrogen-containing cationic sulfonium salt group-containing resins which are electrodepositable on a cathode, and
(ii) one or more aliphatic polyisocyanate curing agents comprising cationic amine salt groups or groups which are capable of forming cationic amine salt groups derived from one or more primary amine groups;
(b) heating the coated substrate in an atmosphere having 5 parts per million or less of $NO_x$ at a temperature and for a time sufficient to cure the electrodeposited coating on the substrate;
(c) applying directly to the cured electrodeposited coating one or more pigment-containing coating compositions and/or one or more pigment-free coating compositions to form a top coat over at least a portion of the cured electrodeposited coating; and
(d) heating the coated substrate of step (c) to a temperature and for a time sufficient to cure the top coat.

21. The process of claim 20, wherein the cured top coat has from 0.1 to 50 percent light transmission measured at 400 nanometers.

22. The process of claim 20, wherein the active hydrogen-containing, cationic sulfonium salt-containing resin (i) is selected from a polyepoxide polymer, an acrylic polymer, a polyurethane polymer, a polyester polymer, copolymers thereof and combinations thereof.

23. The process of claim 20, wherein the resin (i) comprises a polyepoxide polymer.

24. The process of claim 20, wherein the resin (i) comprises an acrylic polymer.

25. The process of claim 20, wherein the curing agent (ii) comprises an at least partially blocked aliphatic polyisocyanate selected from the group consisting of 1,6-hexamethylene diisocyanate, isophorone diisocyanate, bis-(isocyanatocyclohexyl)methane, polymeric 1,6-hexamethylene diisocyanate, trimerized isophorone diisocyante, norbornane diisocyanate, and mixtures thereof.

26. The process of claim 20, wherein the curing agent (ii) comprises an at least partially blocked polyisocyanate comprising one or more pendant basic amine groups.

27. The process of claim 26, wherein the pendant amine groups are capable of being protonated at a pH greater than or equal to 4.

28. The process of claim 27, wherein the pendant amine groups are capable of being protonated at a pH greater than or equal to 5.

29. The process of claim 20, wherein the curing agent (ii) comprises a blocked polyisocyanate essentially free of tertiary amine groups.

30. The process of claim 20, wherein the nitrogen derived from the amine salt groups of curing agent (ii) is present in the cured electrodeposited film of step (b).

31. The process of claim 30, wherein the nitrogen derived from the amine salt groups of curing agent (ii) is substantially consumed in step (b) to form urea groups.

32. The process of claim 20, wherein the curing agent (ii) is at least partially blocked with at least one blocking agent selected from the group consisting of an alkyl alcohol, a 1,2-alkane diol, a 1,3-alkane diol, a benzylic alcohol, an allylic alcohol, an oxime, a glycol ether, caprolactam, a dialkylamine, and mixtures thereof.

33. The process of claim 20, wherein the curing agent (ii) comprises cationic amine salt groups derived from at least one compound selected from ethanolamine, propanolamine, 4-amino-1-butanol, 5-amino-1-pentanol, diglycolamine, 2-amino-2-methyl-1-propanol, 2-(2-aminoethylamino) ethanol, 2-(3-aminopropylamino)ethanol, aminoethylpiperazine, N-propylethylenediamine, N-methylpropanediamine, diethylenetriamine, 1,3-diamino-2-hyroxypropane, triethylene tetramine and higher homologs, and the reaction product of a primary amine in the form of a ketimine which also contain at least one active hydrogen group with an epoxide such as ethylene oxide or propylene oxide.

34. The process of claim 33, wherein the curing agent (ii) comprises cationic salt groups derived from diglycolamine, ethanolamine, diethylenetriamine, 2-(2-aminoethylamino) ethanol, and 2-amino-2-methyl-1-propanol.

35. The process of claim 20, wherein said electrodepositable coating composition is in the form of an electrodeposition bath having conductivity 1000 to 3000 microsiemens/cm at 20 percent solids.

36. The process of claim 20, wherein the coated substrate of step (a) is heated to a temperature ranging from 275° to 400° F. (135° to 204.4° C.).

37. The process of claim 20, wherein the electrodepositable coating composition is free of lead compounds.

38. A process for forming a photodegradation-resistant multi-layer coating on an electroconductive substrate comprising the following steps:
(a) electrophoretically depositing on the substrate a curable electrodepositable coating composition to form an electrodeposited coating over at least a portion of the substrate, the substrate serving as a cathode in an electrical circuit comprising the cathode and an anode, the cathode and the anode being immersed in the aqueous electrodepositable coating composition, wherein electric current is passed between the cathode and the anode to cause the coating to be electrodeposited over at least a portion of the substrate, the electrodepositable coating composition comprising a resinous phase dispersed in an aqueous medium, said resinous phase comprising:
(i) one or more ungelled, active hydrogen-containing cationic sulfonium salt group-containing resins which are depositable on a cathode, and (ii) one or more aliphatic polyisocyanate curing agents comprising cationic amine salt groups or groups which are capable of forming cationic amine salt groups derived from one or more primary amine groups;

(b) heating the coated at a temperature and for a time sufficient to cure the electrodeposited coating on the substrate;

(c) applying directly to the cured electrodeposited coating one or more pigment-containing coating compositions and/or one or more pigment-free coating compositions to form a top coat over at least a portion of the cured electrodeposited coating; and (d) heating the coated substrate of step (c) to a temperature and for a time sufficient to cure the top coat, wherein the improvement comprises the inclusion in the circuit of a non-ferrous anode.

39. The process of claim 38, wherein the aqueous electrodepositable coating composition is in the form of an electrodeposition bath comprising less than 10 parts per million soluble iron.

40. The process of claim 38, wherein the coated substrate of step (a) is heated in an atmosphere having 5 parts per million or less of $NO_x$.

41. The process of claim 38, wherein the cured electrodeposited coating of step (b) comprises less than 10 parts per million soluble iron.

42. The process of claim 38, wherein the curable electrodepositable coating composition further comprises a material selected from at least one of a hindered amine light stabilizer, an antioxidant, an ultraviolet light absorber, and mixtures thereof.

43. A process for coating an electroconductive substrate comprising the following steps:

(a) electrophoretically depositing on the substrate a curable electrodepositable coating composition to form an electrodeposited coating over at least a portion of the substrate, the electrodepositable coating composition comprising a resinous phase dispersed in an aqueous medium, said resinous phase comprising:

(i) one or more ungelled, active hydrogen-containing cationic sulfonium salt group-containing resins which are electrodepositable on a cathode, and (ii) one or more aliphatic polyisocyanate curing agents comprising cationic amine salt groups or groups which are capable of forming cationic amine salt groups derived from one or more primary amine groups; and (b) heating the coated substrate to a temperature and for a time sufficient to cure the electrodeposited coating on the substrate.

44. The process of claim 43, wherein the active hydrogen-containing, cationic sulfonium salt group-containing resin (i) is selected from a polyepoxide polymer, an acrylic polymer, a polyurethane polymer, a polyester polymer, copolymers thereof and combinations thereof.

45. The process of claim 43, wherein the resin (i) is present in the electrodepositable coating composition in an amount ranging from 10 to 95 percent, based on total weight of resin solids present in the electrodepositable coating composition.

46. The process of claim 43, wherein the resin (i) comprises a polyepoxide polymer.

47. The process of claim 43, wherein the resin (i) comprises an acrylic polymer.

48. The process of claim 43, wherein the resin (i) comprises a polyurethane polymer.

49. The process of claim 43, wherein the resin (i) comprises a polyester polymer.

50. The process of claim 43, wherein the curing agent (ii) is present in the electrodepositable coating composition in an amount ranging from 5 to 90 percent, based on total weight of resin solids present in the electrodepositable coating composition.

51. The process of claim 43, wherein the curing agent (ii) comprises an at least partially blocked aliphatic polyisocyanate selected from the group consisting of 1,6-hexamethylene diisocyanate, isophorone diisocyanate, bis-(isocyanatocyclohexyl)methane, polymeric 1,6-hexamethylene diisocyanate, trimerized isophorone diisocyante, norbornane diisocyanate, and mixtures thereof.

52. The process of claim 43, wherein the curing agent (ii) comprises an at least partially blocked polyisocyanate comprising one or more pendant basic amine groups.

53. The process of claim 52, wherein the pendant amine groups are capable of being protonated at a pH greater than or equal to 4.

54. The process of claim 53, wherein the pendant amine groups are capable of being protonated at a pH greater than or equal to 5.

55. The process of claim 43, wherein the curing agent (ii) comprises a blocked aliphatic polyisocyanate essentially free of tertiary amine groups.

56. The process of claim 43, wherein the nitrogen derived from the amine salt groups of curing agent (ii) is present in the cured electrodeposited film of step (b).

57. The process of claim 56, wherein the nitrogen derived from the amine salt groups of curing agent (ii) is substantially consumed in step (b) to form urea groups.

58. The process of claim 43, wherein the curing agent (ii) is at least partially blocked with at least one blocking agent selected from an alkyl alcohol, a 1,2-alkane diol, a 1,3-alkane diol, a benzylic alcohol, an allylic alcohol, an oxime, a glycol ether, caprolactam, a dialkylamine and mixtures thereof.

59. The process of claim 43, wherein the curing agent (ii) comprises cationic salt groups derived from at least one compound selected from ethanolamine, propanolamine, 4-amino-1-butanol, 5-amino-1-pentanol, diglycolamine, 2-amino-2-methyl-1-propanol, 2-(2-aminoethylamino) ethanol, 2-(3-aminopropylamino)ethanol, aminoethylpiperazine, N-propylethylenediamine, N-methylpropanediamine, diethylenetriamine, 1,3-diamino-2-hyroxypropane, triethylene tetramine and higher homologs, and the reaction product of a primary amine in the form of a ketimine which also contain at least one active hydrogen group with an epoxide such as ethylene oxide or propylene oxide.

60. The process of claim 59, wherein the curing agent (ii) comprises cationic salt groups derived from at least one compound selected from diglycolamine, ethanolamine, diethylenetriamine, 2-(2-aminoethylamino)ethanol, and 2-amino-2-methyl-1-propanol.

61. The process of claim 43, wherein said electrodepositable coating composition is in the form of an electrodeposition bath having conductivity 1000 to 3000 microsiemens/cm at 20 percent solids.

62. The process of claim 43, wherein the coated substrate of step (i) is heated to a temperature ranging from 275° to 400° F. (135° to 204.4° C.).

* * * * *